United States Patent
Diffie et al.

(10) Patent No.: US 9,497,160 B1
(45) Date of Patent: Nov. 15, 2016

(54) SYMMETRIC NAT TRAVERSAL FOR DIRECT COMMUNICATION IN P2P NETWORKS WHEN SOME OF THE ROUTING NATS ARE SYMMETRIC

(71) Applicants: Whitfield Diffie, Woodside, CA (US); Anatoli Bolotov, San Jose, CA (US); Mikhail I. Grinchuk, San Jose, CA (US); Ivan Danov, Sofia (BG); Anton Sabev, San Jose, CA (US)

(72) Inventors: Whitfield Diffie, Woodside, CA (US); Anatoli Bolotov, San Jose, CA (US); Mikhail I. Grinchuk, San Jose, CA (US); Ivan Danov, Sofia (BG); Anton Sabev, San Jose, CA (US)

(73) Assignee: Bit Action, Inc., San Jose, CA (US)

( * ) Notice: Subject to any disclaimer, the term of this patent is extended or adjusted under 35 U.S.C. 154(b) by 22 days.

(21) Appl. No.: 13/925,796

(22) Filed: Jun. 24, 2013

(51) Int. Cl.
*H04L 12/28* (2006.01)
*H04L 29/12* (2006.01)

(52) U.S. Cl.
CPC ......... *H04L 61/25* (2013.01); *H04L 29/12471* (2013.01); *H04L 61/255* (2013.01); *H04L 61/256* (2013.01); *H04L 61/2521* (2013.01); *H04L 61/2567* (2013.01)

(58) Field of Classification Search
CPC ............. H04L 61/25; H04L 29/12462; H04L 29/12471; H04L 67/104
USPC .................................................. 370/392, 252
See application file for complete search history.

(56) References Cited

U.S. PATENT DOCUMENTS

| | | | |
|---|---|---|---|
| 2003/0126192 A1* | 7/2003 | Magnussen .................... | 709/202 |
| 2006/0075127 A1* | 4/2006 | Juncker et al. ................ | 709/229 |
| 2006/0182100 A1* | 8/2006 | Li et al. ......................... | 370/389 |
| 2007/0076605 A1* | 4/2007 | Cidon .................. | H04L 12/2697 370/230 |
| 2008/0317020 A1* | 12/2008 | Horne ........................... | 370/389 |
| 2011/0219113 A1* | 9/2011 | Grewal et al. ................ | 709/224 |
| 2012/0023257 A1* | 1/2012 | Vos et al. ....................... | 709/232 |
| 2012/0054265 A1* | 3/2012 | Kazerani et al. ............. | 709/203 |
| 2012/0113841 A1* | 5/2012 | Todd et al. .................... | 370/252 |
| 2014/0071954 A1* | 3/2014 | Au et al. ....................... | 370/336 |
| 2014/0280989 A1* | 9/2014 | Borkowski ........... | H04L 67/104 709/228 |

* cited by examiner

*Primary Examiner* — Andrew Chriss
*Assistant Examiner* — Romani Ohri
(74) *Attorney, Agent, or Firm* — John Chandler

(57) ABSTRACT

Systems, apparatuses and methods are described for facilitating connection between two or more clients across a network that includes network address translators (NATs). In a particular implementation, the techniques include peer-to-peer (P2P) traffic processing and network address translator (NAT) traversal. Low cost data traffic processing techniques with minimal server intervention are disclosed. The techniques can establish direct connections between clients located in private networks behind NATs. In the case where the clients are each behind a symmetric NAT, the connection can be established indirectly via a non-symmetric NAT (used as a relay) which establishes connection with both symmetric NATs using the disclosed direct connection techniques.

48 Claims, 29 Drawing Sheets

Pseudo Code for NAT Type Detection Using a Server (Server Perspective)

201    server creates 2 listen sockets on server_ip:SRV_PORT1 and server_ip:SRV_PORT2;
202    wait to receive packets;
203    if (received packet type == GET_NAT_REQ)
       return packet type GET_NAT_REP;
204    if (received packet type == SRV_REQ)
       return packet type SRV_REP for other client (if other client nat_type> 0);
205    For connection method without the use of Symmetric NAT Detection
206    server creates listen socket on server_ip:SRV_PORT1;
207    server waits to receive packets;
208    if (received packet type ==SRV_REQ)
209    return packet type SRV_REP for other client (if other client nat_type> 0);

Pseudo Code for Symmetric NAT Type Detection Using a Server (Client Perspective)

211    client generates unique ID;
212    client creates listen socket on CLI_PORT;
213    client sends packet from local_address:CLI_PORT to server_ip:SRV_PORT1 type GET_NAT_REQ;
214    client receives packet from server:SRV_PORT1 type GET_NAT_REP and save nat_address1:nat_port1;
215    client sends packet from local_address:CLI_PORT to server_ip:SRV_PORT2 type GET_NAT_REQ;
216    client receives packet from server:SRV_PORT2 type GET_NAT_REP and saves nat_address2:nat_port2;
217    if (nat_port1 == nat_port2)
              nat_type = CONE NAT;
       else
              nat_type = SYMMETRIC NAT;

NAT TYPE DETECTED

FIG. 2

Pseudo code of a dynamic programming method for
optimal partitioning of M into S terms 802 Let p_goal > 0 be the permitted probability of failure (like 0.1, 0.01, 0.001).

804 Create real array q[0...N]

806 q[0] = 1
808 q[i] = (1 - M/(N-i+1))q[i-1] for i=1,2,... until q[i] <= p_goal is found (it will be found, because q[N-M+1] = 0)

810 Let Na = the first index i such that q[i] <= p_goal

812 If q[S] <= p_goal, then stop the process: optimal set of series is 1+1+...+1 (Na terms), and the average cost is M+q[0]+q[1]+...+q[Na-1].

814 Otherwise create real array cost[1...S][0...Na], integer array last[1...S][0...Na] and real array c[1...Na-1].

816 Let cost[j][0] = M, last[j][0] = 0 for j=1...S.
818 Let cost[1][i] = M + i, last[1][i] = i for i = 1...N.

820 For j=2...S do:
{
822     for i=0...j-1 define cost[j][i] = cost[j-1][i], last[j][i] = 0
824     for i=j...Na do:

826       for k=j-1...i-1 compute c[k] = cost[j-1][k] + (i-k)q[k]
828         let k_opt = such value of k where c[k] was minimal
830         define cost[j][i] = c[k_opt], last[j][i] = i - k_opt
}

832     Final value of average cost is cost[S][Na].

Optimal partitioning of Na into S terms k[1]+...k[S] is the following:

834     k[S] = last[S][Na]
836     k[S-1] = last[S-1][Na-k[S]]
838     k[S-2] = last[S-2][Na-k[S]-k[S-1]]
...
840     k[1] = last[1][Na-k[S]-k[S-1]-...-k[2]]

FIG. 8

Values for N = 32256, S = 1...5, P = 0.9, 0.99, 0.999

| S | P | M | k[1]+...+k[S] | Average Cost |
|---|---|---|---|---|
| 1 | 0.9 | 272 | 271 | 543 |
| 1 | 0.99 | 384 | 383 | 767 |
| 1 | 0.999 | 469 | 469 | 938* |
| 2 | 0.9 | 216 | 131+210 | 433.9 |
| 2 | 0.99 | 261 | 175+387 | 529.0 |
| 2 | 0.999 | 290 | 199+557 | 580.8 |
| 3 | 0.9 | 199 | 87+115+168 | 401.0 |
| 3 | 0.99 | 233 | 112+173+344 | 464.9 |
| 3 | 0.999 | 246 | 127+215+548 | 493.6 |
| 4 | 0.9 | 193 | 64+ 79+101+138 | 385.3 |
| 4 | 0.99 | 218 | 83+112+167+310 | 435.3 |
| 4 | 0.999 | 226 | 94+132+219+523 | 454.9* |
| 5 | 0.9 | 185 | 53+ 61+ 73+ 91+120 | 375.8 |
| 5 | 0.99 | 209 | 66+ 83+110+160+282 | 418.4 |
| 5 | 0.999 | 216 | 74+ 95+133+217+493 | 433.3 |
| 6 | 0.9 | 265 | 60+68+79+93+113+144 | 523.3 |
| 6 | 0.99 | 287 | 78+94+116+152+217+368 | 576.8 |
| 7 | 0.9 | 259 | 52+58+65+75+87+104+129 | 517.1 |
| 7 | 0.99 | 282 | 67+77+92+114+147+207+339 | 565.9 |
| 8 | 0.9 | 255 | 46+50+56+62+71+81+96+117 | 512.5 |
| 9 | 0.9 | 255 | 40+44+48+53+59+66+76+88+105 | 508.9 |
|   |   |   | . . . |   |
| 13 | 0.9 |   | 28+30+31+33+36+38+41+44+49+54+60+67+77 | 500.1 |

FIG. 9A

| Origination Port | Origination IP Address | Destination Port | Destination IP Address | TTL |
|---|---|---|---|---|
| 3107 | 38.16.44.123 | 4095 | 161.4.37.55 | short |
| 3107 | 38.16.44.123 | 5001 | 161.4.37.55 | short |
| 3107 | 38.16.44.123 | 5007 | 161.4.37.55 | short |
| 3107 | 38.16.44.123 | 5009 | 161.4.37.55 | short |
| 3107 | 38.16.44.123 | 5015 | 161.4.37.55 | short |
| 3107 | 38.16.44.123 | 5018 | 161.4.37.55 | short |
| 3107 | 38.16.44.123 | 5033 | 161.4.37.55 | short |
| 3107 | 38.16.44.123 | 5037 | 161.4.37.55 | short |
| 3107 | 38.16.44.123 | 5044 | 161.4.37.55 | short |
| 3107 | 38.16.44.123 | 5048 | 161.4.37.55 | short |
| 3107 | 38.16.44.123 | 5051 | 161.4.37.55 | short |
| 3107 | 38.16.44.123 | 5071 | 161.4.37.55 | short |
| 3107 | 38.16.44.123 | 5073 | 161.4.37.55 | short |
| 3107 | 38.16.44.123 | 5074 | 161.4.37.55 | short |
| 3107 | 38.16.44.123 | 5081 | 161.4.37.55 | short |
| 3107 | 38.16.44.123 | 5089 | 161.4.37.55 | short |
| 3107 | 38.16.44.123 | 5111 | 161.4.37.55 | short |
| 3107 | 38.16.44.123 | 5212 | 161.4.37.55 | short |
| 3107 | 38.16.44.123 | 5333 | 161.4.37.55 | short |
| 3107 | 38.16.44.123 | 5338 | 161.4.37.55 | short |
| 3107 | 38.16.44.123 | 5339 | 161.4.37.55 | short |

FIG. 9B

| Origination Port | Origination IP Address | Destination Port | Destination IP Address | TTL |
|---|---|---|---|---|
| 2075 | 161.4.37.55 | 3107 | 38.16.44.123 | long |
| 4322 | 161.4.37.55 | 3107 | 38.16.44.123 | long |
| 4347 | 161.4.37.55 | 3107 | 38.16.44.123 | long |
| 4586 | 161.4.37.55 | 3107 | 38.16.44.123 | long |
| 4672 | 161.4.37.55 | 3107 | 38.16.44.123 | long |
| 4850 | 161.4.37.55 | 3107 | 38.16.44.123 | long |
| 4933 | 161.4.37.55 | 3107 | 38.16.44.123 | long |
| 4937 | 161.4.37.55 | 3107 | 38.16.44.123 | long |
| 4973 | 161.4.37.55 | 3107 | 38.16.44.123 | long |
| 5048* | 161.4.37.55 | 3107 | 38.16.44.123 | long |
| 5217 | 161.4.37.55 | 3107 | 38.16.44.123 | long |
| 5339 | 161.4.37.55 | 3107 | 38.16.44.123 | long |
| 5422 | 161.4.37.55 | 3107 | 38.16.44.123 | long |
| 5497 | 161.4.37.55 | 3107 | 38.16.44.123 | long |
| 5567 | 161.4.37.55 | 3107 | 38.16.44.123 | long |
| 5707 | 161.4.37.55 | 3107 | 38.16.44.123 | long |
| 5822 | 161.4.37.55 | 3107 | 38.16.44.123 | long |
| 5949 | 161.4.37.55 | 3107 | 38.16.44.123 | long |
| 6021 | 161.4.37.55 | 3107 | 38.16.44.123 | long |
| 6212 | 161.4.37.55 | 3107 | 38.16.44.123 | long |
| 7458 | 161.4.37.55 | 3107 | 38.16.44.123 | long |

FIG. 9C

Values for N =64512, S =1...5, P =0.9, 0.99, 0.999

| S | P | M | k[1]+...+k[S] | Average Cost |
|---|---|---|---|---|
| 1 | 0.9 | 385 | 384 | 769.0 |
| 1 | 0.99 | 543 | 543 | 1086.0 |
| 1 | 0.999 | 665 | 664 | 1329.0 |
| 2 | 0.9 | 307 | 185+296 | 614.3 |
| 2 | 0.99 | 377 | 243+538 | 749.1 |
| 2 | 0.999 | 409 | 283+794 | 822.7 |
| 3 | 0.9 | 285 | 122+161+235 | 567.7 |
| 3 | 0.99 | 327 | 160+247+493 | 658.3 |
| 3 | 0.999 | 349 | 180+304+777 | 699.0 |
| 4 | 0.9 | 274 | 91+111+142+195 | 545.2 |
| 4 | 0.99 | 310 | 117+157+236+439 | 616.4 |
| 4 | 0.999 | 322 | 132+187+308+739 | 644.3 |
| 5 | 0.9 | 265 | 73+86+102+128+168 | 532.0 |
| 5 | 0.99 | 295 | 94+118+156+227+402 | 592.4 |
| 5 | 0.999 | 307 | 104+135+189+306+698 | 613.6 |

FIG. 10

FROM THE PERSPECTIVE OF A SERVER – NAT DETECTION 1102 server creates 2 listen sockets on server_ip:SRV_PORT1 and server_ip:SRV_PORT2;
1104 wait to receive packets;
1106 if (received packet type == GET_NAT_REQ)
　　　return packet type GET_NAT_REP;
1108 if (received packet type == SRV_REQ)
　　　return packet type SRV_REP for other client (if other client nat_type> 0);

FROM THE PERSPECTIVE OF A SERVER – NO NAT DETECTION 1110 server creates listen socket on server_ip:SRV_PORT1;
1112 server waits to receive packets;
1114 if (received packet type ==SRV_REQ)
1116 return packet type SRV_REP for other client (if other client nat_type> 0);

FROM THE PERSPECTIVE OF A CLIENT 1118 client generates unique ID;
1120 client creates listen socket on CLI_PORT;
1122 client sends packet from local_address:CLI_PORT to server_ip:SRV_PORT1 type GET_NAT_REQ;

1124 client receives packet from server:SRV_PORT1 type GET_NAT_REP and save nat_address1:nat_port1;

126 client sends packet from local_address:CLI_PORT to server_ip:SRV_PORT2 type GET_NAT_REQ;

1128 client receives packet from server:SRV_PORT2 type GET_NAT_REP and saves nat_address2:nat_port2;

1130 if (nat_port1 == nat_port2)
　　　　　nat_type = CONE NAT;
　　else
　　　　　nat_type = SYMMETRIC NAT;

NAT TYPE DETECTED

FIG. 11

PSEUDO CODE ILLUSTRATING USE OF SYMMETRIC NAT DETECTION

1202  Clients detect NAT type;
1204  client1 sends packet type SRV_REQ from client1:CLI1_PORT to server_ip:SRV_PORT1;
1206  client2 sends packet type SRV_REQ from client2:CLI2_PORT to server_ip:SRV_PORT1;
1208  client1 receives packet type SRV_REP with nat type, nat_address:nat_port of client 2;
1210  client2 receives packet type SRV_REP with nat type, nat_address:nat_port of client 1;

1212  if (two clients with nat_type == CONE NAT)

CLIENT1:
1214  sends packet type CLI_REQ from client1:CLI1_PORT to client2 nat_address:nat_port with short TTL (5);
1216  while (! a packet type CLI_REP received from client2 on client1:CLI1_PORT)
      {
1218        wait AWAIT_CONNECT milliseconds;
1220        sends packet type CLI_REQ from client1:CLI1_PORT to client2 nat_address:nat_port with long TTL (64);
      }
1222  sends packet type CLI_REP from client1:CLI1_PORT to client2 nat_address:nat_port;
1224  connection established;

CLIENT2:
1226  sends packet type CLI_REQ from client2:CLI2_PORT to client1 nat_address:nat_port with short TTL (5);
1228  while (! a packet type CLI_REP received from client1 on client2:CLI2_PORT)
      {
1230        wait AWAIT_CONNECT milliseconds;
1232        sends packet type CLI_REQ from client2:CLI2_PORT to client1 nat_address:nat_port with long TTL (64);
      }
1234  sends packet type CLI_REP from client2:CLI2_PORT to client1 nat_address:nat_port;
1236  connection established;

1238  if ((one client with nat_type == SYMMETRIC NAT) AND
         (other client with nat_type == CONE NAT) )

1240  if ((nat_type of client1 == CONE NAT) AND
         (nat_type of client2 == SYMMETRIC NAT))
1242        CLIENT_S = client2;
1244        CLIENT_C = client1;

1246  else if ((nat_type of client1 == SYMMETRIC NAT) AND (nat_type of client2 == CONE NAT))
1248  CLIENT_S = client1;  and  CLIENT_C = client2;
1250  else    goto two_symmetric_nats;

FIG. 12

INSTRUCTIONS FOR CONE AND SYMMETRIC NATS

1302 CLIENT_C (client with CONE NAT) - Phase 3A
1304 for (I = 0; i< M; i++)
{
1306     port = ports_3a [I];
1308     CLIENT_C sends packet type CLI_REQ from CLIENT_C:CLIENT_C_PORT port to CLIENT_S nat_address:port with short TTL (5);
1310     wait SLOWLY microseconds;
}
1312 wait to receive packet on CLIENT_C:CLIENT_C_PORT;
1314 connection established;

1316 CLIENT_S (client with SYMMETRIC NAT) - Phase 3B
1318 wait PHASE_3A_TIME microseconds for CLIENT_C to finish;
1320 j = 0;
1322 for (g = 0; g < S; g++)
{
1324     for (i = 0; i< k [g]; i++)
{
1326         port = ports_3b [i + j];
1328         create a "listen" socket on local_address:port;
1330         CLIENT_S sends packet type CLI_REQ from local_address:port to nat_address:nat_port of CLIENT_C;
1332         wait SLOWLY microseconds;

1334         if (a packet type CLI_REP received from CLIENT_C on CLIENT_S sockets)
{

1336             reply from the socket which received a CLI_REP packet to the address and port that the packet came from;
1338             close other sockets;
1340             connection established;
1342             exit;
}
}
1344     wait AWAIT_CONNECT milliseconds to receive packet type CLI_REP from CLIENT_C on CLIENT_S sockets;
1346 if (a packet type CLI_REP received from CLIENT_C on CLIENT_S sockets) {
1348         reply from the socket which received a CLI_REP packet to the address and port that the packet came from;
1350         close all other sockets;
1352         connection established;
1354         exit;
1356 }     j += k [g];
1358 }   FAIL;

FIG. 13

PSEUDO CODE INSTRUCTIONS FOR CONNECTING CLIENTS

For Each client:

1402  generate unique ID
1404  create a listen socket on local port (CLI1_PORT or CLI2_PORT)
1406  sends packet type SRV_REQ from local_address:local_port to server_ip:SRV_PORT1 and receive packet type SRV_REP with nat_address:nat_port of other client 1408  Try STUN-like UDP hole punching method
1410  sends packet type CLI_REQ from local_address:local_port to nat_address:nat_port of other client with short TTL (5);

1412  wait AWAIT_CONNECT milliseconds,
1414  if (a packet from other client is received on local_address:local_port)
1416  goto DONE (see FIG. 15)

1418  sends packet type CLI_REQ from local_address:local_port to nat_address:nat_port of other client with short TTL (5);
1420  wait AWAIT_CONNECT milliseconds , 1422  if (a packet from other client is received on local_address:local_port)
1424  goto DONE (see FIG. 15)

1426  send packet type CLI_REQ from local_address:local_port to nat_address:nat_port of other client with long TTL (64);
1428  AWAIT_CONNECT milliseconds , 1430  if (a packet from other client is received on local_address:local_port)
1432        goto DONE (see FIG. 15)

1434  sends packet type CLI_REQ from local_address:local_port to nat_address:nat_port of other client with long TTL (64);
1436  AWAIT_CONNECT milliseconds,
1438  if (a packet from other client is received on local_address:local_port)
1440  goto DONE (see FIG. 15)

FIG. 14

Phase 3A

```
1502  for (i = 0; i< M; i++)

1504       port = ports_3a [i];
1506       sends packet type CLI_REQ from local_address:local_port to other
client nat_address:port with short TTL (5);
1508       wait SLOWLY microseconds;
1510       if (a packet from the other client is received on local_address:local_port)
1512            goto DONE (see below);
           }
1514  wait TM_3A_3B milliseconds;
1516  if (a packet from other client is received on local_address:local_port)
1518       goto DONE (see below)
```

Phase 3B

```
1520  j = 0;
1522  for (g = 0; g < S; g++)
{1524      for (i = 0; i< k [g]; i++)  {
1526           port = ports_3b[i + j];
1528           create a "listen" socket on local_address:port;
1530           sends packet type CLI_REQ from local_address:port to other
client nat_address:nat_port;
1532           wait SLOWLY microseconds;

1534           if (a packet type CLI_REP is received from CLIENT_C on
CLIENT_S sockets)
1536                goto DONE (see below);
               }
1538       wait AWAIT_CONNECT milliseconds to receive packet from other client
on sockets;
1540       if (a packet type CLI_REP is received from other client on local sockets)
1542                goto DONE (see below);
1544       j += k [g];
       }

1546  FAIL to establish connection. Exit.
```

DONE: Connection established

```
1548  reply from the socket which received a CLI_REP packet to the address and
port that the packet came from
1550  close all other sockets;
1552  connection is now established;
1554  Exit;
```

FIG. 15

SYMMETRIC NAT TRAVERSAL FOR DIRECT COMMUNICATION IN P2P NETWORKS WHEN SOME OF THE ROUTING NATS ARE SYMMETRIC

BACKGROUND

1. Field

The present disclosure relates to networking and particularly to peer-to-peer (P2P) traffic processing technologies and network address translator (NAT) traversal methods. In particular, the disclosed NAT traversal methods relate to establishing direct connections to clients behind symmetrical NATs and asymmetrical NATs.

2. Related Art

One currently used Internet protocol, IPv4, was originally designed to use a 32-bit address field (IP address) to identify a host. A 32-bit IP address is insufficient to assign a global (or public) IP address to each device on the Internet today.

To overcome this limitation, it was proposed (circa 1994) to assign public IP addresses not only to end-point devices but also to some designated network transition routers which isolate the end-points from the Internet, thereby dividing the network domain into a public domain and a number of isolated private domains. These so called "border routers" started performing a new and important networking task: translating (mapping) IP addresses between the private and the public domains, thus allowing a host within a local network to be able to communicate 2-way globally even though it has a local (private) IP address only. Border routers also hid their local network visibility from the outside, which turned out to be quite helpful for the security and protection of the isolated local networks. Due to this property, Border Routers also became firewalls.

Border Routers, along with a corresponding technique for IP address mapping and with associated security features, came to be referred to as Network Address Translators (NATs). In the meanwhile NATs became widely used both for security and for alleviating the IPv4 address shortage problem. IPv6 is a protocol designed to address the IPv4 address shortage problem. However, no matter the protocols involved, the computing world may still continue to deploy NATs in order to isolate private enterprise and home networks from external visibility.

Currently, there is widespread deployment of different NATs, i.e., NATs with different properties and modes of operation. NATs are not required to be compatible with each other such as in the way that NATs generate their IP address translations. NATs are manufactured by different OEMs, and not only differ from vendor to vendor but even from model to model. The history of NATs has generated an unpleasant side effect, which has become a serious issue and obstacle for many Internet applications: NATs break the end-to-end connectivity of devices and applications by often not allowing the establishment of peer-to-peer (P2P) communications. Almost all NATs block and reject the data transmitted directly between end-points from different private networks. Many contemporary P2P applications—voice over IP (VoIP), multimedia over IP, including Streaming Live A/V or Real-Time Interactive A/V, videoconference instant messaging, online gaming and even online gambling, et al.— seriously suffer from the presence of NATs as unwanted check points on the communication path. The presence of NATs is a limiting factor in the development of P2P applications especially in mobile wireless networks.

These and other disadvantages are overcome with the teachings described in the present disclosure.

SUMMARY

Embodiments, implementations and techniques described herein include systems, apparatuses and methods for facilitating connection between two or more clients across a network that includes NATs. In a particular implementation, for example, the techniques include peer-to-peer (P2P) traffic processing and network address translator (NAT) traversal.

Described herein are new low cost data traffic processing techniques with minimal server intervention. The techniques involve direct NAT traversal techniques for clients behind NATs. The techniques can establish direct connections between clients located in private networks behind NATs. In the case where the clients are each behind a Symmetric NAT, the connection can be established indirectly via a non-Symmetric NAT (used as a relay) which establishes connection with both Symmetric NATs using the proposed direct connection techniques.

This Summary is provided to introduce a selection of concepts in a simplified form that are further described below in the Detailed Description, and thus this summary is not to be used to limit the scope of the subject matter as claimed or described.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings. Throughout, like numerals refer to like parts with the first digit of each numeral generally referring to the figure which first illustrates the particular part.

FIG. 2 is a pseudo-code listing for NAT type detecting according to one implementation.

FIG. 8 is a pseudo-code listing or algorithm of a dynamic programming method for optimal partitioning of M into S number of terms.

FIG. 9A is a table showing generated values from various scenarios of starting values for the traversal method according to one implementation.

FIG. 9B is a table showing generated IP addresses and port numbers based on the generated values of FIG. 9A according to one implementation for divergent packets originating from client B.

FIG. 9C is a table showing generated IP addresses and port numbers based on the generated values of FIG. 9A according to one implementation for convergent packets originating from client A.

FIG. 10 is another table showing generated values from other scenarios of starting values for the traversal method according to one implementation.

FIG. 11 is a pseudo-code listing or algorithm for detection of Symmetric NATs using a server according to one implementation.

FIG. 12 is a pseudo-code listing or set of algorithms illustrating use of Symmetric NAT detection according to one implementation.

FIG. 13 is a pseudo-code listing or set of algorithms illustrating steps to be taken by clients behind either a non-Symmetric or Symmetric NAT type according to one implementation.

FIG. 14 is another pseudo-code listing or set of algorithms illustrating making a connection between clients according to one implementation.

FIG. 15 is another pseudo-code listing or set of algorithms further illustrating making a connection between clients according to one implementation.

DETAILED DESCRIPTION

Figure 1:
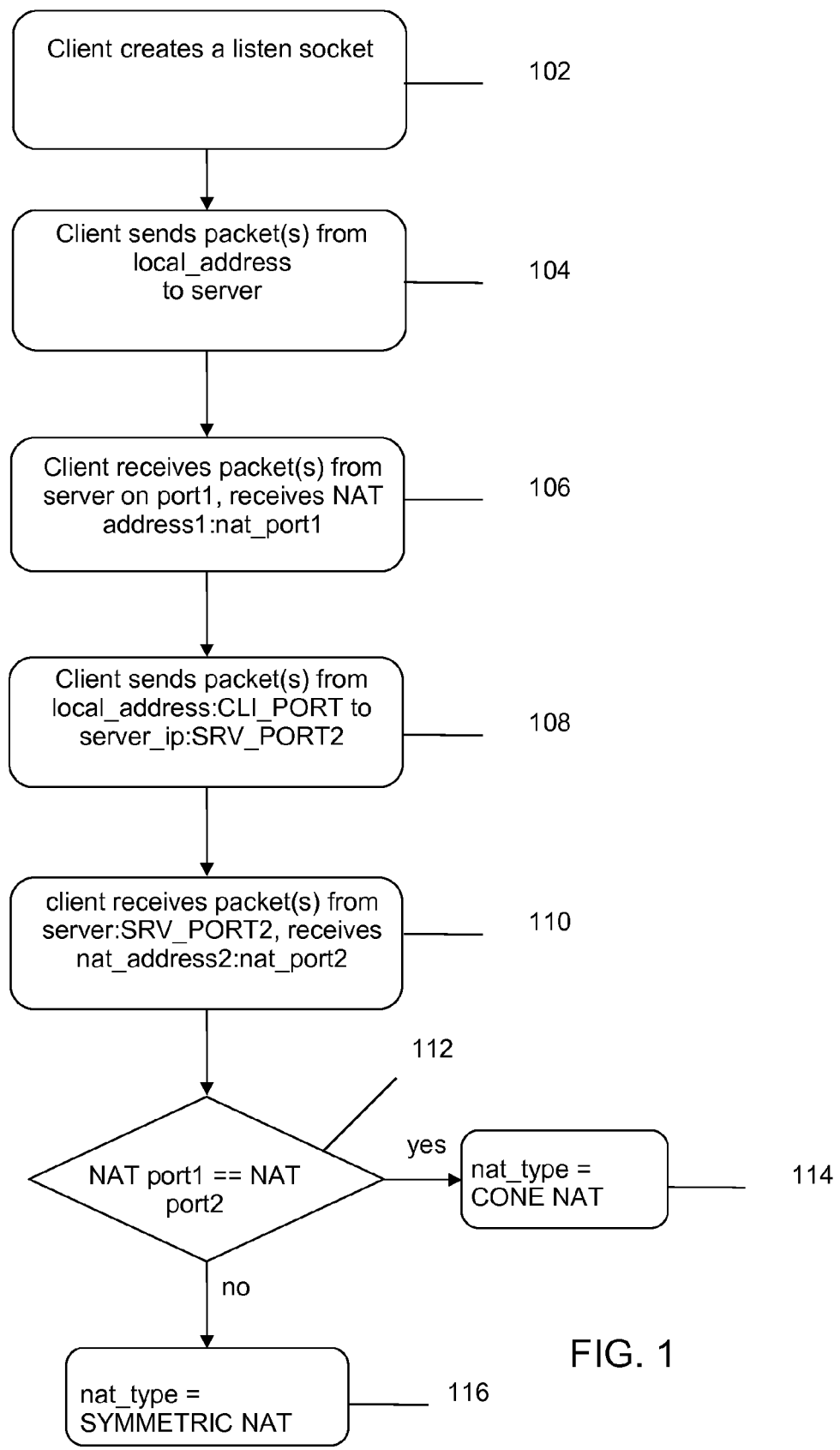
FIG. 1 is a flowchart for detecting NAT types for clients seeking to connect across a public/private network according to one implementation.

Overview. Currently, NAT traversal is an important problem in the computer industry and this disclosure addresses solutions to this problem. In particular, disclosed herein are teachings for setting up a direct (i.e., with and without an initial server intervention, but no subsequent relaying of) P2P communication path. Some of the advantages include savings associated with avoiding the cost of sending data traffic via a server and improved performance between two end-users or clients from separate private networks, i.e., clients or devices that are behind NATs.

Over the years, there have been proposed protocols and methods to solve the NAT traversal problem. Such protocols and methods are greatly dependent upon the type of NAT involved in the communication.

Described immediately below are descriptions and classifications of NATs. One substantive distinction is whether the NAT is symmetric or not. Other distinctions include the following.

Full-cone NAT or one-to-one NAT. This NAT operates such that once an internal address (iAddr:iPort) is mapped to an external address (eAddr:ePort), any packets from iAddr:iPort are sent through eAddr:ePort. Any external host can send packets to iAddr:iPort by sending packets to eAddr:ePort.

Address-restricted-cone NAT. This NAT operates such that once an internal address (iAddr:iPort) is mapped to an external address (eAddr:ePort), any packets from iAddr:iPort are sent through eAddr:ePort. An external host (hAddr:any) can send packets to iAddr:iPort by sending packets to eAddr:ePort only if iAddr:iPort has previously sent a packet to hAddr:any. "Any" means that the port number does not matter.

Port-restricted cone NAT. This NAT is like an address restricted cone NAT, but the restriction includes port numbers. Once an internal address (iAddr:iPort) is mapped to an external address (eAddr:ePort), any packets from iAddr:iPort are sent through eAddr:ePort. An external host (hAddr:hPort) can send packets to iAddr:iPort by sending packets to eAddr:ePort only if iAddr:iPort has previously sent a packet to hAddr:hPort.

Symmetric NAT. Each request from the same internal IP address and port to a specific destination IP address and port is mapped to a unique external source IP address and port. If the same internal host sends a packet even with the same source address and port but to a different destination, a different mapping is used. Only an external host that receives a packet from an internal host can send a packet back. Note that an (Addr:Port) pair (i.e., an IP address and port number) is refer to as a socket. Every TCP and UDP packet contains both a source socket as well as a destination socket.

As used herein, reference to a "cone NAT," if not specifically described differently, refers to a NAT that is not a Symmetric NAT. As an example, in the pseudo code listings, a variable may be listed as a "cone NAT", but is merely a variable to refer to a non-symmetric NAT. In other places, cone NAT is in reference to the cases where a detection algorithm outcome determines that a client is not behind a Symmetric NAT.

NATs control connections between the public and the private domains by creating and updating connections in a table. Each entry (called a binding) of the table contains the internal socket (i.e., internal IP address and port number) and external NAT socket, where NAT replaces the internal (private) address with its global IP address and map the internal port number to some external port number, according to the NAT type and a port binding strategy in use. Note that Symmetric NATs do not reuse ports for multiple connections.

The NAT classification can be also clarified and described as follows. A packet sent from an internal address (iAddr: iPort) to an external host (hAddr:hPort) and internal address (iAddr:iPort) is mapped (by a NAT) to an external address (eAddr:ePort), that is iAddr:iPort and will be sent through eAddr:ePort of the NAT. This can be denoted as follows:

[iAddr:iPort->hAddr:hPort]====>[eAddr:ePort->hAddr: hPort]

Using the above notation of NAT mappings, the NAT classification can be characterized in the following way (note the first bullets in the first 3 NAT types are the same).

Full-Cone NAT:
both [iAddr:iPort->hAddr:hPort] and [iAddr:iPort->h'Addr:h'Port] produce the same eAddr:ePort
after [iAddr:iPort->hAddr:hPort], all external packets [any:any->eAddr:ePort] are accepted and delivered to iAddr:iPort Address-Restricted-Cone NAT:
both [iAddr:iPort->hAddr:hPort] and [iAddr:iPort->h'Addr:h'Port] produce the same eAddr:ePort
after [iAddr:iPort->hAddr:hPort], all external packets [hAddr:any->eAddr:ePort] are accepted and delivered to iAddr:iPort Port-Restricted-Cone NAT:
both [iAddr:iPort->hAddr:hPort] and [iAddr:iPort->h'Addr:h'Port] produce the same eAddr:ePort
after [iAddr:iPort->hAddr:hPort], only external packets [hAddr:hPort->eAddr:ePort] are accepted and delivered to iAddr:iPort Symmetric NAT:
[iAddr:iPort->hAddr:hPort] and [iAddr:iPort->h'Addr:h'Port] produce different eAddr:ePort and e'Addr:e'Port
after [iAddr:iPort->hAddr:hPort], only external packets [hAddr:hPort->eAddr:ePort] are accepted and delivered to iAddr:iPort Below are examples of existing (and proposed) NAT traversal protocols along with some of their disadvantages.

STUN (Simple Traversal of UDP through NATs). STUN is used for communication between a client and a server. STUN cannot support traversal of Symmetric NATs. STUN works well only in the case of traversing a full cone NAT. The RFC for STUN can found at: http://tools.iettorg/html/rfc5389

TURN (Traversal Using Relay NAT). TURN uses a relay server which requires a high data bandwidth expense and is impractical for scaling to a large number of clients and requires data intensive P2P communications. The RFC for TURN can found at: http://tools.ietf.org/html/rfc5766

ICE (Interactive Connectivity Establishment). ICE uses a framework defining how to combine STUN and TURN to establish a P2P connection. The disadvantages of the STUN and TURN protocols apply. The RFC for ICE can be found at http://tools.ietf.org/html/rfc5245

UPnP (Universal Plug and Play), Demilitarized Zone (DMZ). These protocols are not universally supported in all devices, which prevents building a P2P network based on such technologies.

Proprietary solutions (e.g., Skype®, Viber®, Teredo tunneling) do not connect when a Symmetric NAT is present on the path, resulting in Server Relay or Client Relay being required as a back up in a significant number of cases. Many proprietary solutions fail to provide connectivity due to a lack of universal deployment.

Previously used (known) protocols need to be backed up by TURN-like sessions in a separate relay server for communication, which implies a massive intervention of a server and large network bandwidth used from the relaying server.

The presence of a Symmetric NAT on the data path forces the necessity of relaying via a server. Techniques described herein assist in avoiding relaying via a server. Relaying via a server is inefficient, generally requires high performance servers, and involves non-optimal network use. Reversal connections work only when one of the clients is located behind a NAT. Hole punching only works when there are no Symmetric NATs on the path between peers. Port number (port binding) Prediction is not reliable and is not suitable for Symmetric NATs with random port binding.

In summary, the common drawbacks of the known P2P traffic processing technologies and NAT traversal methods are summarized as follows. Prior P2P solutions fail to provide a direct P2P connection when a Symmetric NAT is present anywhere on the direct connection path between the peers (e.g., peer devices, peer applications). This requires a substantially higher percentage of traffic to be insured against true P2P connection failure by relaying. The session connections are made by relaying which results in unwanted delays, heavy network traffic, and required use of high performance scalable servers and large network bandwidth.

Direct NAT Traversal

The techniques described herein provide solutions that address the above-referenced problems. These techniques include new low cost traffic processing. Minimal server interaction is needed. In particular, disclosed herein are direct NAT traversal methods for clients behind NATs. Described is how to establish a connection between clients located in private networks behind NATs. It is noted that the techniques may not be computationally advantageous in making connections in the relatively rare case when the clients are each behind a Symmetric NAT.

At a minimum, the techniques described herein are a low cost solution for P2P clients or applications allowing: (1) minimal interaction with a server, (2) optimized use of a small number of packets to be interchanged to establish a connection, and (3) an optimized time to establish a connection. When interaction with a server is used, the associated steps only involve exchange or transmission of a client IP address and port information. In one example, a server may be communicate: (1) to a first client whether the first client and a second client are both available for a connection, (2) to the first client and/or the second client IP addresses to use for attempting a connection, and (3) a start signal for the first client and second client to begin attempting to establish a connection. The start signal sent to the first client may be sent at a substantially same time as the start signal sent to the second client. Alternatively, the start signal sent to each respective client may be sent at different times. The start signal or command may include a timestamp at a present time or future time at which to begin the connection attempt. The timestamp value may be based on one or more factors. Such factors may include an actual or estimated network latency, an alarm set by one or more devices or the server, and a time set by one or more of the clients that are attempting connection with each other. Two or more clients or applications may attempt to connect with each other at the same time, or in some sequence.

The techniques described herein include direct NAT traversal methods to establish one or more network connections: (1) between clients located in distinct private networks, each behind one or more NATs and where at least one NAT is not a Symmetric NAT in the chain of NATs between the client in question and a public network such as the Internet; and (2) if desired, for multiple clients, simultaneous establishment of two or more connections to a particular or originating client.

To date, according to the knowledge of the inventors, no one else has established a successful and reliable practical method for NAT traversal in the case where a Symmetric NAT with random mapping is present on the routing path between the clients. Part of the difficulty involving establishment of a connection involves the property of most routers that limit the number of packets that can arrive at the NAT from either outside or inside per unit time. If a rapid rate of packet delivery is detected, the IP address(es) and/or ports are typically placed on a blacklist or in some way treated as an intrusion or labeled as improper traffic. Further salvos (batches of IP address-port combinations) are then restricted for a time from either a first client or second client thereby preventing a connection between the two clients.

Common steps of the NAT traversal methods described herein include: (1) selection of particular algorithms and their parameters ("scenarios"), and (2) practical optimization, validation, and testing of the NAT traversal scenario.

It is to be understood that the specific order or hierarchy of steps in the disclosed methods are examples of approaches. Based upon design preferences, it is to be understood that the specific order or hierarchy of steps in the method(s) can be rearranged while remaining within the scope of the disclosed techniques. The claims present various steps or instructions in a sample order, and the disclosed steps or instructions are not meant to be limited to the specific order or hierarchy presented.

NAT Type Detection and Initialization

There are at least two methods of establishing connections: use of NAT type detection and no checking of NAT type. That is, the techniques described herein may operate with and without NAT "type" detection. A first method involves performing a NAT type detection. A second method does not perform NAT type detection before proceeding with attempting establishment of a connection between clients. Some of the steps performed herein, such as ones that rely on NAT type detection, may bear some analogy with STUN. However, there are substantial and substantive distinctions. For example, in contrast to STUN, one method economically detects and classifies one or more NATs in the network pathway according to a simple taxonomy, such as dividing the detected NATs as: "Symmetric NAT" or "All Other NATs."

For simplicity and to cut the terminology, in the following descriptions, Symmetric NATs are referred to as Type A NATs, and all others as Type B NATs. On occasion, the Type B NATs may be referred to as CONE NATs for sake of contrast to Type A NATs. A common and useful case occurs when a user desires to establish a connection between a client that is behind a Type A NAT and a client behind a Type B NAT. The techniques described herein also function when the clients are each behind a Type B NAT.

Described is a sample implementation of NAT type detection with particular numbers; this implementation is shown in FIG. 1. This implementation maybe modified by adjusting one or more preset parameters and timing constraints. With reference to FIG. 1, NAT type detection includes creating (by a client) a listen socket 102 on a client device. The client sends one or more packets from a local address (e.g., via a local NAT) to a server 104. This server is designated and made available for the purpose of NAT type detection. The server receives the packet(s) at a pre-arranged, pre-designated or already known IP address and port. The client receives one or more packets from the server on or from the designated port at step 106. The one or more packets include the client's NAT address and NAT port information. At step 108, a client sends one or more packets from the local address and client port (a socket) to a second server IP address and server port (a second socket). At step 110, the originating client receives one or more packets from the server from the second server socket (second server IP address and server port). At step 110, in these one or more packets, the client obtains a NAT address and port. At step 112, the first client investigates to determine if the ports from the two sockets are the same. If so, at step 114, the NAT type is a CONE NAT. Otherwise, at step 116, the NAT type is a Symmetric NAT (Type A). This process can also be described as follows. Two Clients connect to a server. The server tests each client and tells each client whether it is associated with a Symmetric NAT (Type A) or not (Type B).

The server also gives each client the IP address and port of the other client's NAT, the NAT associated with the respective client that is closest to the server. In an example of an implementation of this method, the Client or clients send to destination ports 50000 and 50001 from source port 40000. The server listens to ports 50000 and 50001. If the source port of the packet (as seen by the server) from destination 50000 is equal to the source port received from 50001, then this client becomes "Client Type B". The actual source port number that matches between the two packets received by the server is saved as EXT_SRC_PORT_B and sent to both Clients. Otherwise the client under test becomes "Client Type A". The server tells the client under test its Client Type and the visible IP addresses and port of the other client.

In illustrative implementations, the described communicative steps, such as sending packets between particular ports of the clients and server may be achieved via one or more particular settings. For example, other ports may be selected, or other number of ports may be involved, etc. For example, three, four or fifty ports may be involved.

An example of a NAT type detection method is also described in FIG. 2 in pseudo code. The individual steps are not described here in the Specification, as the steps of the pseudo code are self-explanatory. There are two sets of pseudo code in FIG. 2—a first set directed to pseudo code, steps or instructions that operate on a server, and a second set directed to pseudo code, steps or instructions that operate on a client. Such client uses the server to determine a NAT type between the client and the server.

General NAT traversal method. This section describes a general or generic NAT traversal method that can be applied to the case when a client is behind a NAT of Type A (i.e., Symmetric NAT with true random mapping of internal IP addresses and ports of the clients behind that Symmetric NAT). Algorithms, instructions and computer executable code implementing this method establish a connection between clients behind NATs where previously known methods, algorithms and protocols fail.

In what follows, send and receive packets means at least UDP over IP. But for a person of ordinary skill it is possible to extend the proposed methods and algorithms to other protocols (e.g., TCP, ICMP).

Generally, there are four cases or scenarios for making a connection across a network.

Figure 3:
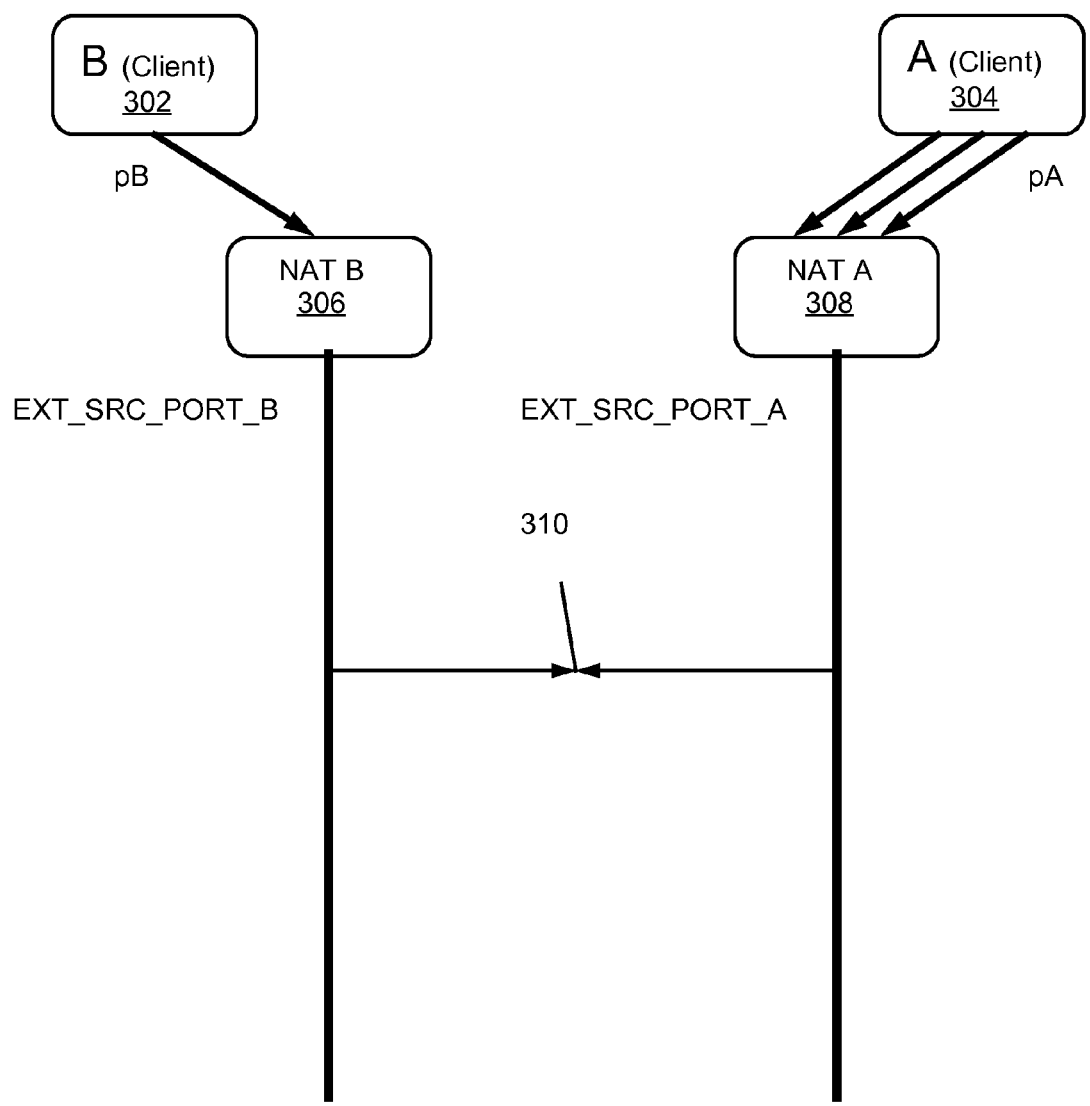
FIG. 3 is a schematic representation for connecting clients that are each behind a Type B (non-symmetric) NAT according to one implementation.

CASE 1. The first case involves the technically easy case when both NATs are of Type B. Making a connection between clients B, A in this case is straight forward provided both binding port pairs are known: (pB, EXT_POPT_B) for NAT B and (pA, EXT_POPT_A) for NAT A, respectively. This method is illustrated in FIG. 3. With reference to FIG. 3, a client operating on a first device 302 connects with a client operating on a second device 304 through its NAT 306 and through the NAT 308 of the second device 304. One or more packets are sent from the source port pB to destination port EXT_SRC_PORT_A. One or more packets are sent from the source port pA to destination port EXT_SRC_PORT_B. For example, a connection is established by having one or both clients send information from source port 40000 to the IP address and binding port of the other client, and having one or both clients 302, 304 listen to port 40000. When one or more packets are received, a reply is sent to the listen port 40000 and thus a connection 310 is established.

CASE 4. The hard case or fourth scenario—when each client is behind a Symmetric NAT (Type A)—is not described herein. However, the techniques described herein may be used to advantage in attempting to establish a connection between these clients.

In the second a third scenarios, either the first client is behind a Type B NAT (second scenario) or the second client is behind a Type B NAT (third scenario). There are probabilistic characteristics involved in the NAT traversal method in these two scenarios.

It is helpful to understand the techniques described herein by first understanding a formulation of a related probabilistic problem.

Suppose a bag contains N balls; initially the balls are unmarked. One person B selects M of the balls, then marks each of the selected M balls with a mark and puts them back into the bag. Then a person A retrieves k[1] balls, marks them with her own mark and does not return the selected and marked balls to the bag. If at least one ball has two marks (one mark from person A and one mark from person B), the process is finished—a connection is made. Otherwise, gets k[2] more balls are selected by person A, and person A marks the selected balls with her mark; she does not return the selected balls to the bag. After retrieving k[2] number of balls, if at least one of the selected balls has two marks (from person A and person B), the process is finished—a connection is made. This process of selecting balls by person A can be repeated until a ball with 2 marks is obtained. The repeating can be represented as further steps of k[3], k[4], . . . , k[S] balls, where the number of steps, S, is a predefined or calculated value or parameter. That is, the process is repeated, as needed, a certain number of times. In practice, the retrieval of balls is analogous to sending packets and marking a ball with two marks is analogous to finding information that can lead to an established connection between person A and person B. In practice in the problem of directly connecting two clients, the withdrawing by persons A and B may be done independently of each other—i.e., in any order without regard for the actions of the other person. In practice, the process of attempting to establish a connection can be made much more complex. For example, each "ball" may be one or a plurality of packets (a "salvo" of packets). As another example, each "ball" may be associated with a time to live or TTL such as a short or long TTL. Thus, each salvo may be sent with either a short or long TTL. The selection of balls and use of short and long TTL's may be done independent of one another.

Mathematically, the problem can be expressed as a probability P and a number of steps S, to identify values of M and k[1], . . . , k[S] such that: (1) an actual probability of finding a ball with two marks is not less than a desired and given probability P, and (2) an average number of all marks made during the process is as minimal possible. In this analogy, a mark can mean a packet, or one or more packets used to lead to a successful connection between a first client and a second client.

The mathematic problem can be solved numerically. Namely, let $$F(N,x,y)=(N-x)!(N-y)!/(N!(N-x-y)!)$$

Then probability of failure P_fail (i.e., of not finding a ball with two marks) after 1, 2, . . . , S steps can be expressed as follows:

$$P\_fail(N,M,k[1])=F(N,M,k[1])$$

$$P\_fail(N,M,k[1],k[2])=P\_fail(N,M,k[1])*F(N-k[1],M,k[2])$$

$$P\_fail(N,M,k[1],k[2],k[3])=P\_fail(N,M,k[1],k[2])F(N-k[1]-k[2],M,k[3])$$

. . .

$$P\_fail(N,M,k[1], \ldots ,k[S])=P\_fail(N,M,k[1], \ldots ,k[S-1])*F(N-k[1]- \ldots -k[S-1],M,k[S])$$

These equations can be used to calculate the probability of failure, and the related value of the probability of success. In the mathematic problem above, balls may be equated to data packets sent via a network protocol. These packets are used to establish a connection—the event represented by finding a first ball with two marks.

The mathematic probability problem can be reformulated as a task to optimize the expected number of packets used (e.g., sent, consumed, produced) before a connection between clients is likely established. This problem is pertinent to both scenario two and scenario three. In the problem, the clients and packets may be considered as follows: if a ball is marked twice this means that the proposed algorithm or method has created an outbound entry in a NAT's connection tracking table, followed by a reply which establishes a connection. Herein, a table is presented with parameters, which can be used along with the NAT traversal method shown in FIGS. 5A, 5B and 5C. A person of ordinary skill using the formulas can extend the table for other values N, S and P not presented in the table.

The average cost (number of marks used for the balls, number of packets sent for the clients) can be expressed as follows:

$$M+k[1]+k[2]*P\_fail(N,M,k[1])+k[3]*P\_fail(N,M,k[1],k[2])+ \ldots +k[S]*P\_fail(N,M,k[1], \ldots ,k[S-1])$$

Now, described herein is one example of how to select the characteristics to achieve a pre-set level of probability for establishing a connection between clients. There are other ways to optimize and cope with the probabilistic characteristics of the disclosed methods. For example, a system may be programmed to optimize a total number of packets used to establish a connection between a client behind a NAT of Type A and a client behind a NAT of type B. Other optimizations of the algorithms and techniques are possible. For example, optimization may be achieved for establishing a connection before a designated time, and for meeting a maximum power consumption requirement for a certain device on a per connection basis.

Figure 4:
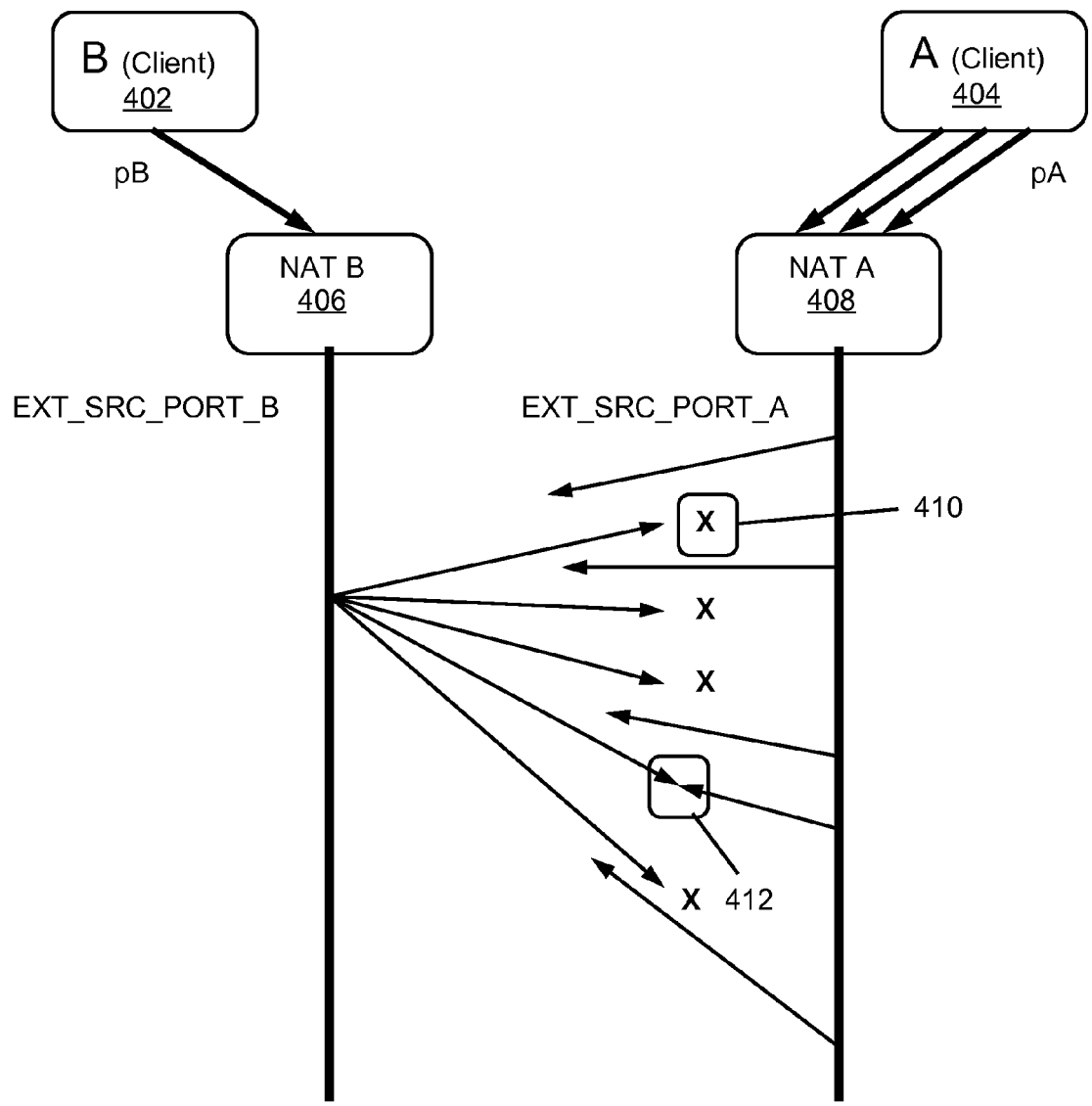
FIG. 4 is a schematic representation for connecting clients when one of the clients is behind a Type A (symmetric) NAT according to one implementation.
Figure 5A:
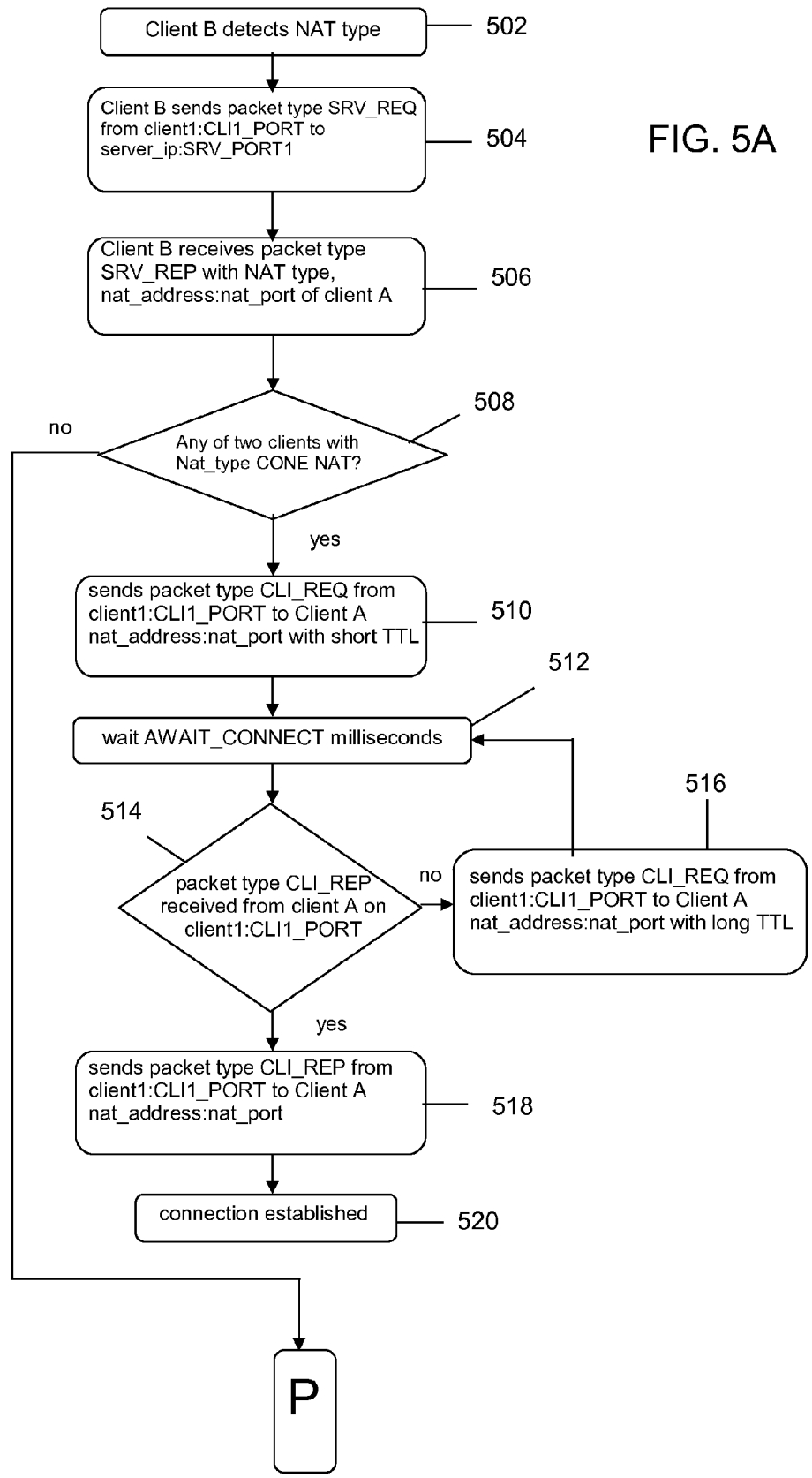
FIG. 5A is a first portion of a flowchart from the perspective of a first client when one of the clients is behind a Type A (symmetric) NAT according to one implementation.
Figure 5B:
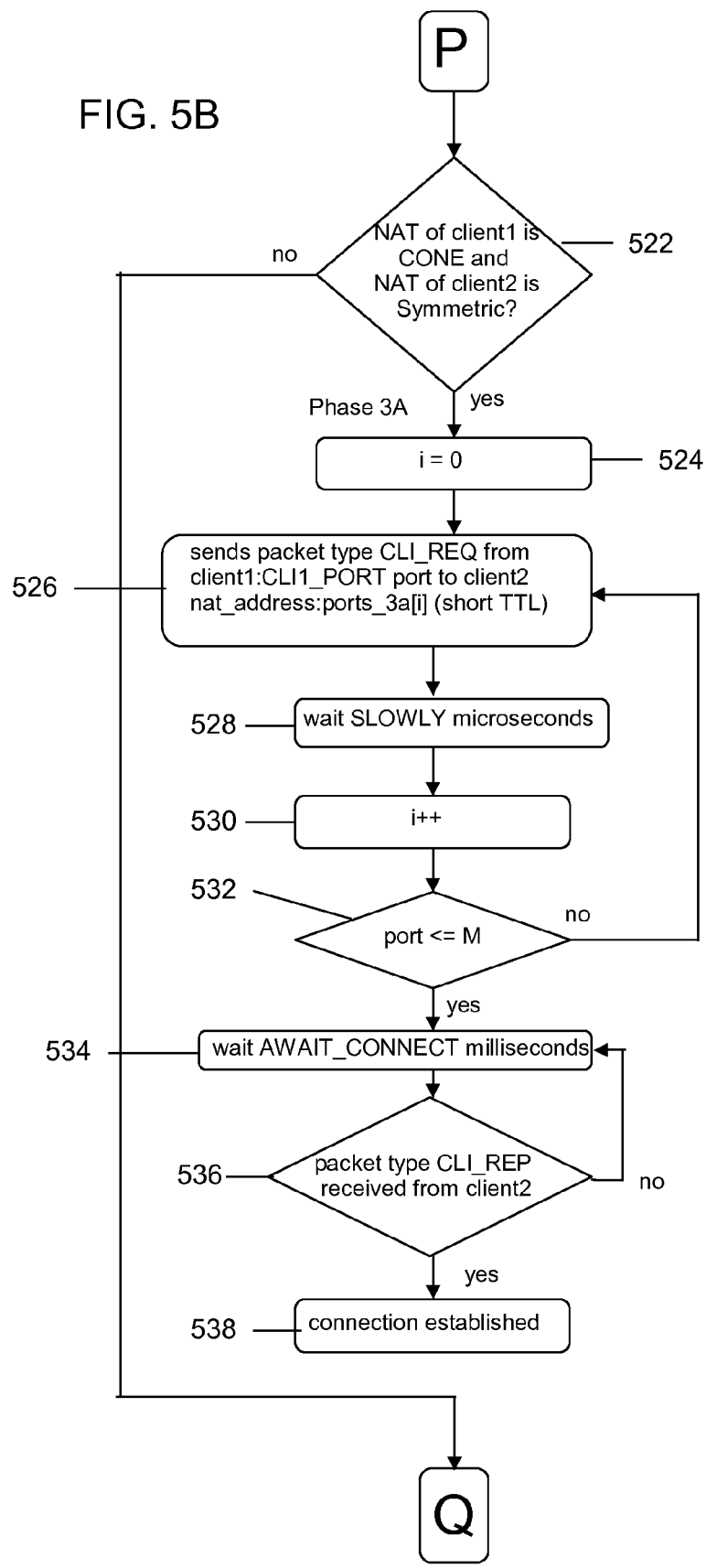
FIG. 5B is a second portion of a flowchart from the perspective of a first client when one of the clients is behind a Type A (symmetric) NAT according to one implementation.

One implementation of the method is illustrated in FIG. 4 and is described in relation to the flowcharts depicted in FIGS. 5A and 5B. In one implementation of this method, it is set before beginning the method to connect successfully 99.9% of the time. To achieve this level of success, the following are values of parameters that can be used:

Connect Probability Pr=99.9%;
Client type B: Nb=226;
Client type A: k1=94, k2=132, k3=219, k4=523; and
Na=k1+k2+k3+k4=968 (max value). Using the indicted values yields 454.9 as an average number of packets used to establish a connection 99.9% of the time.

With reference to FIG. 4, a client B (402) is behind a Type B NAT (406). A user of client B (402) desires to establish a connection between client B (402) and another client, client A (404). Client A (404) is behind a Symmetric NAT (Type A NAT) (408). In order to establish the connection, it is helpful to recall the mathematic probability problem. Client B (402) sends packets from a source port pB to destination ports in the range [pA, pA+nb−1]. This is a set of salvos from the same IP address and is considered divergent: out to many ports. This equates to Nb number of packets. This step is analogous to marking for the first time a number of balls. From the perspective of Client A (404), Client A sends a first series of packets from source ports in the range of [pA, pA+k1−1] to destination port EXT_SRC_PORT_B of client B. This is one or more sets of salvos from different IP addresses to the same destination port and is considered convergent: directed to the same port of Client B. Client A repeats sending a series of packets (an ith series of packets) from source ports in the range of [pA, pA+ki−1] to destination port EXT_SRC_PORT_B of client B. Success occurs when client A receives a reply from client B and this leads to a successful connection 412. Most of the packets sent from client A and client B lead to a lack of connection 410. These sent packets are unsuccessful and are typically ignored by the NATs (406, 408). However, one or more of the packets eventually lead to a successful connection 412. In practice, this occurs within a very short time, e.g., 600 milliseconds, 2 seconds, 3.5 seconds.

Further steps in this implementation might be as follows. Client B (402) opens one socket and sends (SLOWLY, TTL=short) from port 40000 to ports 50000 . . . (50000+ Nb−1). Client A opens Na sockets and sends (SLOWLY) for (i=0; i<k1; i++) send (source port 50000+i, destination port EXT_SRC_PORT_B). If Client A (404) receives a reply after any series, it discontinues sending immediately. Another step includes wait AWAIT_CONNECT time, if no connection, for (i=0; i<k2; i++) send(source port 50000+i+k1, destination port EXT_SRC_PORT_B). Wait AWAIT_CONNECT time, if no connection, for (i=0; i<k3; i++) send(source port 50000+i+k1+k2, destination port EXT_SRC_PORTB). Another step includes wait AWAIT_CONNECT time, if no connection, for (i=0; i<k4; i++) send(source port 50000+i+k1+k2+k3, destination port EXT_SRC_PORT_B). Another step includes wait AWAIT_CONNECT time, if no connection, fail to connect given the desired parameters of probability P and maximum packet expense. If a connection is enabled or established, the method includes keeping the channel alive by sending periodic keep alive packets in both directions and utilize the channel for a P2P communication.

In further embodiments, the probability of connectivity, the numbers of packets and timing in the iteration and pauses between them as well as TTL values may be chosen in view of one or more goals. These goals may include adding or improving performance (e.g., timing parameters and constraints chosen to minimize the average time to establish a connection provided that the other parameters are fixed or held constant). These goals may also include saving power consumed by a device at the expense of minimizing the average time to establish a connection. These goals may also include balancing various tasks operating on a device or in an operating system such that the attempts to establish a connection do not saturate or excessively burden the operation of the device or diminish the user experience or performance of features of the user interface of the device.

Operation and performance values may also be chosen based on one or more network conditions or network equipment functionality. Such network conditions may include one or more time-outs or triggers of blacklists of NATs currently installed in the network path between clients using the techniques described herein. The method illustrated in FIG. 4 is also illustrated in the flowcharts depicted in FIGS. 5A and 5B.

Figure 5C:
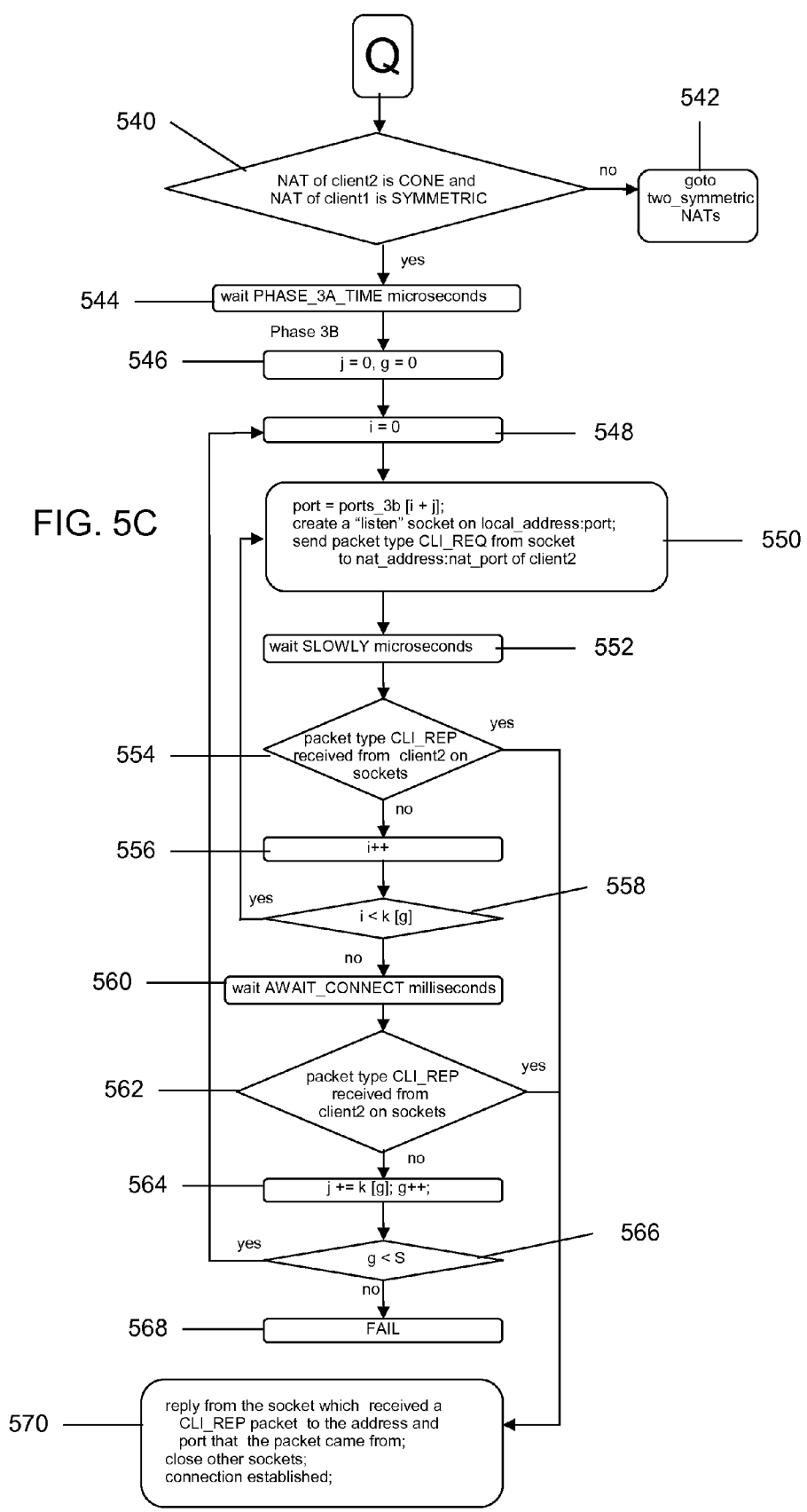
FIG. 5C is a third portion of a flowchart from the perspective of a first client when one of the clients is behind a Type A (symmetric) NAT according to one implementation.

FIG. 5A is a flowchart from the perspective of a first client, like client B (402) in FIG. 4. FIGS. 5A, 5B and 5C are flowcharts of an example of a method for attempting a connection with the use of Symmetric NAT detection.

With reference to FIG. 5A, Client B detects the NAT type at step 502—whether its corresponding NAT is Type A or Type B. At step 504, Client B sends a packet from its client1 IP address and port CLI1_PORT to the server at server_ip: SRV_PORT1. At step 506, Client B receives one or more packets with the type SRV_REP that communicate the NAT type to Client B. Client B also receives one or more packets that communicate the NAT address and port corresponding to Client A via nat_address:nat_port. At step 508, it is determined whether at least one of the two clients is associated with a Type B NAT such as a CONE NAT. If this is true, at step 510, Client B sends one or more packets according to packet type CLI_REQ from client1: CLI1_PORT to Client A at nat_address:nat_port with a short TTL (time to live). Packets sent with a short TTL may be referred to as "S" type packets. At 512, Client B waits a certain time AWAIT_CONNECT, typically measured in milliseconds. At step 514, Client B determines whether one or more packets of type CLI_REP are received from Client A on client1:CLI1_PORT. If not, at step 516, Client B sends packet type CLI_REQ from client1:CLI1_PORT to Client A at nat_address:nat_port with a long TTL. Packets sent with a long TTL may be referred to as "L" type packets. If the condition is true at step 514, at step 518, Client B sends packet type CLI_REP from client1:CLI1_PORT to Client A at nat_address:nat_port. At step 520, a connection between Client B and Client A is established. If step 508, fails, execution continues onto FIG. 5B via "P".

FIG. 5B is a continuation of the flowchart shown in FIG. 5A. With reference to FIG. 5B, at step 522, Client B determines whether the NAT of client1 is a CONE and NAT of client2 is Symmetric. FIG. 5B is associated with Phase 3A (as is explained further herein). If the answer is yes at step 522, the process continues directly downward through subsequent steps. At step 524, the index i is initialized to zero and a loop is implemented at steps 526 through 532. At step 526, Client B sends packet type CLI_REQ from client1: CLI1_PORT port to client2 nat_address:ports_3a[i] (according to a short TTL, in one implementation). At step 528, Client B waits SLOWLY as measured in microseconds. At step 530, the index i is incremented, and at step 532 a condition is checked to see if the port<=M. If not, the loop is repeated. If so, at step 534, Client B waits AWAIT_CONNECT milliseconds. At step 536, another determination is made: is packet type CLI_REP received from client2? If so, then processing continues at step 538—indicating that a connection is established. If the determination at step 522 is "no," then the method continues via "Q" on FIG. 5C.

FIG. 5C is a continuation of the flowchart shown in FIG. 5B—via "Q." With reference to FIG. 5C, at step 540, a determination is made whether the NAT associated with client2 is a CONE type NAT and the NAT of client1 is a Symmetric type NAT. If not, at step 542, processing passes to "goto two_symmetric NATs" corresponding to the case where both Client A and Client B (client2 and client1) are each behind one or more Symmetric type NATs. If at step 540, the answer is "yes," then execution continues to step 544. At step 544, the client waits PHASE_3A_TIME microseconds. Phase 3B is associated with FIG. 5C. At step 546 indexes j and g are initialized. At step 548, index i is initialized. At step 550, the port is set according to: port=ports_3b[i+j], and a "listen" socket is created on local_address:port. Further, at step 550, one or more packets are sent from socket to nat_address:nat_port of client2 according to "packet type CLI_REQ". At step 552, the client waits SLOWLY microseconds. At step 554, a determination is made—whether packet type CLI_REP is received from client2 on (one or more) sockets. If not, processing continues. If "yes," then a connection is established. At step 570, a reply is received from the socket which received one or more CLI_REP packets to the address and port that the packet(s) came from. At step 570, the connection between Client A and Client B is established; other sockets are closed.

Returning to the procedure at step 554, if packet type CLI_REP is not received from client2 on (one or more) sockets, at step 556, the index i is incremented, and at step 558 a determination is made: i<k[g]? If not, then processing continues. Otherwise, for the "yes" case, control passes back to step 550. At step 560, the client waits AWAIT_CONNECT milliseconds. At step 562, a determination is made—whether packet type CLI_REP is received from client2 on (one or more) sockets. If "yes," then a connection is established and execution passes to step 570. If "no," then, indexes are incremented at step 564, and at step 566 a determination is made: is g<S? If yes, then processing returns to 548. Otherwise, if g<S fails (the determination is "no"), then processing continues to step 568. At step 568, the process of attempting to establish a connection between client1 and client2 has failed. In one implementation, the process may be repeated programmatically with other values of parameters (e.g., probability Pr, S), or the client or device (or user of such) may decide to re-attempt to make a connection using a same set of values for the parameters.

Figure 6A:
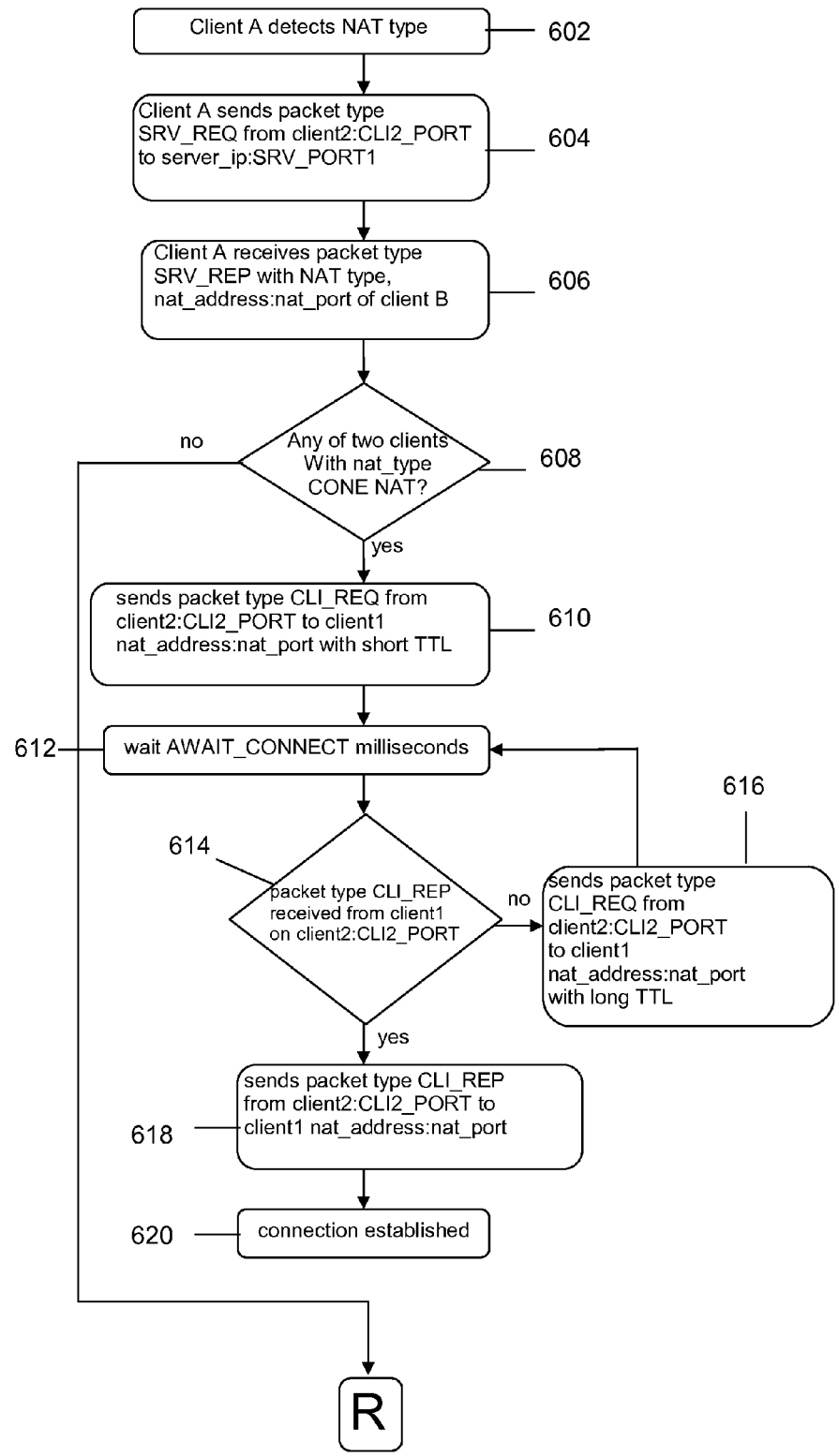
FIG. 6A is a first portion of a flowchart from the perspective of a second client when one of the clients is behind a Type A (symmetric) NAT according to one implementation.
Figure 6B:
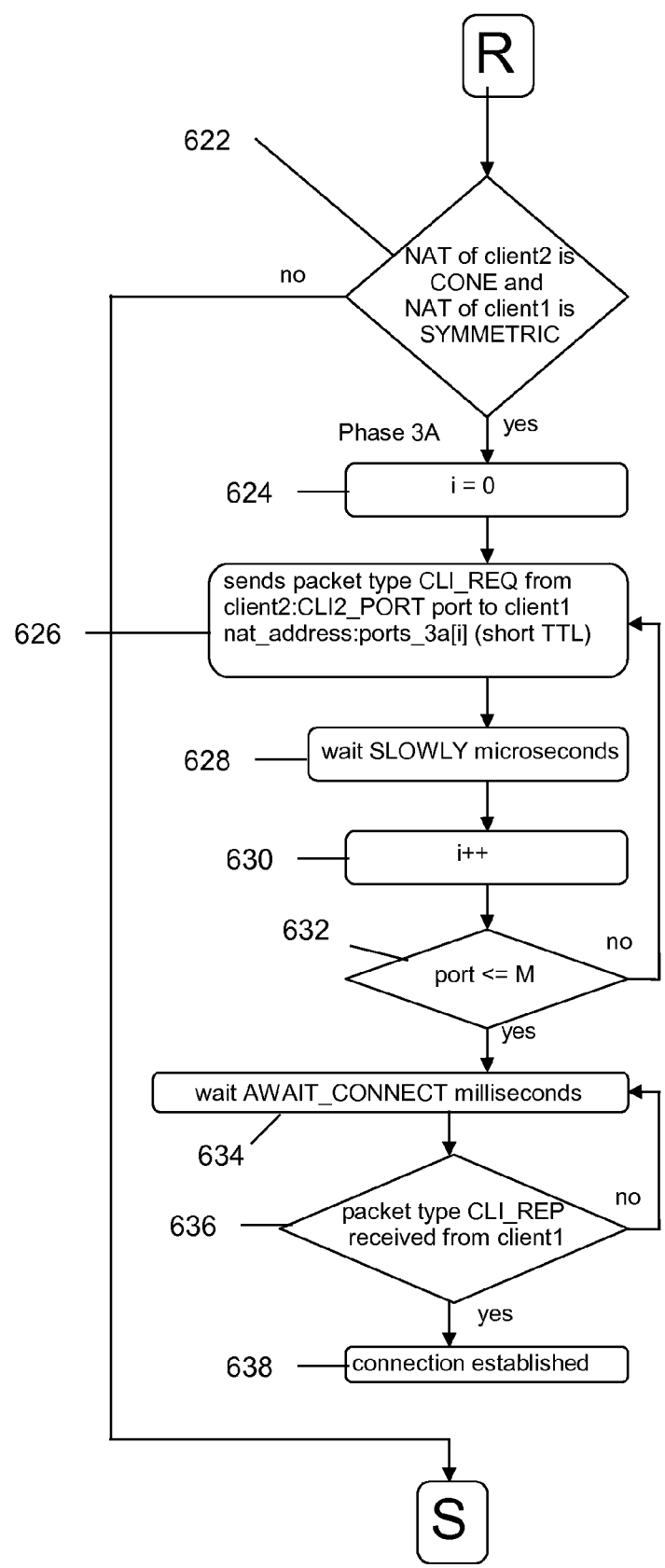
FIG. 6B is a second portion of a flowchart from the perspective of a second client when one of the clients is behind a Type A (symmetric) NAT according to one implementation.
Figure 6C:
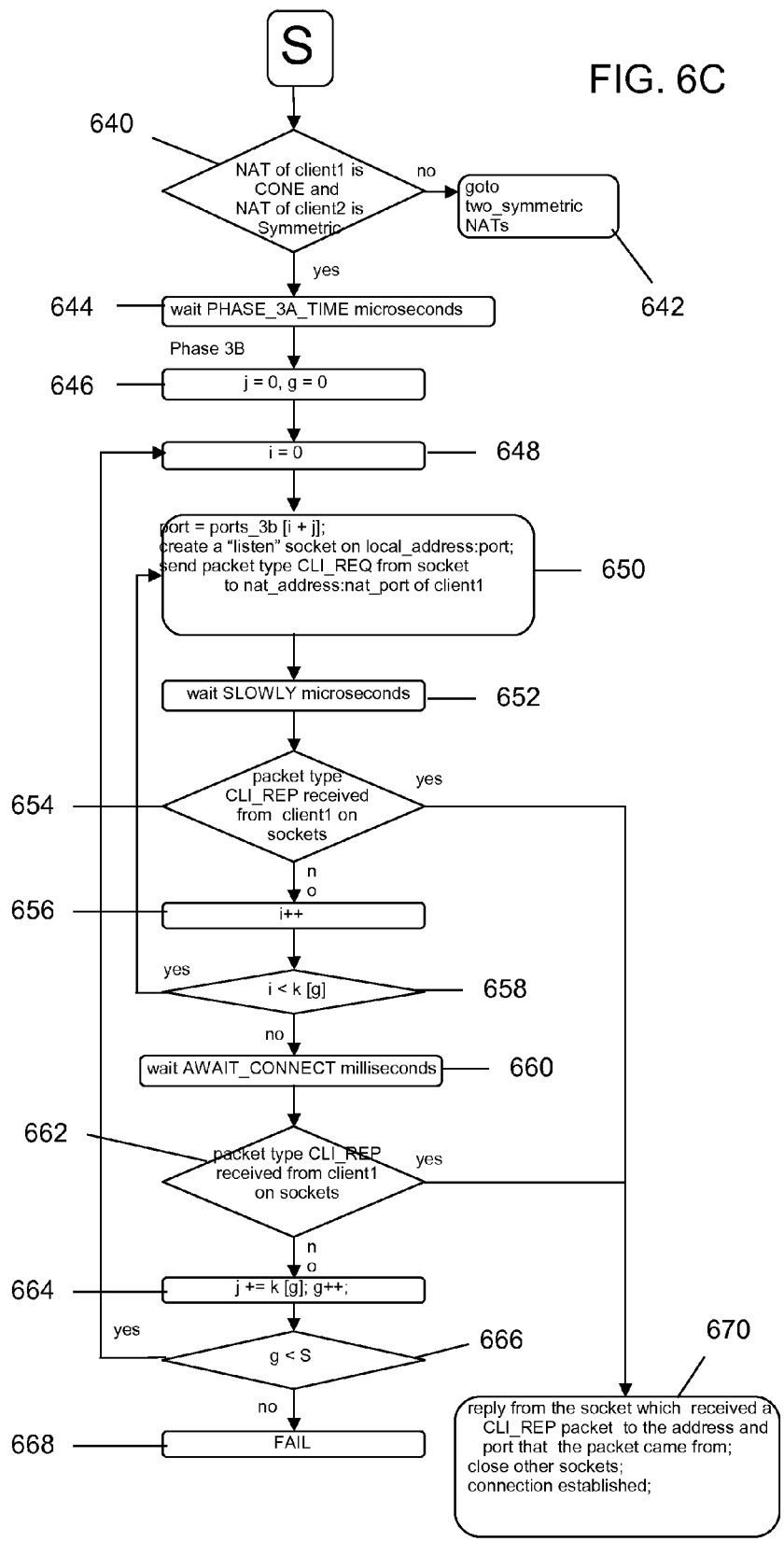
FIG. 6C is a third portion of a flowchart from the perspective of a second client when one of the clients is behind a Type A (symmetric) NAT according to one implementation.

FIG. 6A is a flowchart from the perspective of a second client, like Client A (404) in FIG. 4. FIGS. 6A, 6B and 6C are flowcharts of an example of a method for attempting a connection with the use of Symmetric NAT detection.

With reference to FIG. 6A, Client A detects the NAT type at step 602—whether its corresponding NAT is Type A or Type B. At step 604, Client A sends one or more packets from its client2 IP address and port CLI2_PORT to the server at server_ip:SRV_PORT1. At step 606, Client A receives one or more packets with the type SRV_REP that communicate the NAT type to Client A. Client A also receives one or more packets that communicate the NAT address and port corresponding to Client B via nat_address: nat_port. At step 608, it is determined whether at least one of the two clients is associated with a Type B NAT such as a CONE NAT. At step 608, if this is true ("yes"), at step 610, Client A sends one or more packets according to packet type CLI_REQ from client2:CLI2 PORT to Client B (client1) at nat_address:nat_port with a short TTL (time to live). If the determination at step 608 is not true ("no"), execution continues on FIG. 6B via "R."

At 612, Client A waits a certain time AWAIT_CONNECT, typically measured in milliseconds. At step 614, Client A determines whether one or more packets of type CLI_REP are received from client1 (Client B) on client2:CLI2_PORT. If not, at step 616, Client A sends packet type CLI_REQ from client2:CLI2_PORT to Client B at nat_address: nat_port with a long TTL. If it is true ("yes") at step 614, at step 618, Client A sends packet type CLI_REP from client2: CLI2_PORT to Client B at nat_address:nat_port. At step 620, a connection between Client B and Client A is established.

FIG. 6B is a continuation of the flowchart shown in FIG. 6A via "R." With reference to FIG. 6B, at step 622, Client A determines whether the NAT of client2 is a CONE type and NAT of client1 is Symmetric type. FIG. 6B is associated with Phase 3A (as is explained further herein). If the answer is yes at step 622, the process continues directly downward through subsequent steps. At step 624, the index i is initialized to zero and a loop is implemented at steps 626 through 632. At step 526, Client A sends packet type CLI_REQ from client2:CLI2_PORT port to client1 nat_address:ports_3a[i] (according to a short TTL, in one implementation). At step 628, Client A waits SLOWLY as measured in microseconds. At step 630, the index i is incremented, and at step 632 a condition is checked to see if the port<=M. If not, the loop is repeated. If so, at step 634, Client A waits AWAIT_CONNECT milliseconds. At step 636, another determination is made: is packet type CLI_REP received from client1? If so ("yes"), processing continues at step 638—indicating that a connection is established. If the determination at step 622 is "no," then the method continues via "S" on FIG. 6C.

FIG. 6C is a continuation of the flowchart shown in FIG. 6B—via "S." With reference to FIG. 6C, at step 640, a determination is made whether the NAT associated with client1 is a Type B NAT and the NAT of client2 is a Symmetric type or Type A NAT. If not, at step 642, processing passes to "goto two_symmetric NATs" corresponding to the case where both Client A and Client B (client2 and client1) are each behind one or more Symmetric type NATs. If at step 640, the answer is "yes," then execution continues to step 644. At step 644, the client waits PHASE_3A_TIME microseconds. Phase 3B is associated with FIG. 6C. At step 646, indexes j and g are initialized. At step 648, index i is initialized. At step 650, the port is set according to: port=ports_3b[i+j], and a "listen" socket is created on local_address:port. Further, at step 650, one or more packets are sent from socket to nat_address:nat_port of client1 according to "packet type CLI_REQ". At step 652, the client (Client A) waits SLOWLY microseconds. At step 654, a determination is made—whether packet type CLI_REP is received from client1 on (one or more) sockets. If not, processing continues. If "yes," is the determination at step 654, then a connection is established at step 670. At step 670, a reply is received from the socket which received one or more CLI_REP packets to the address and port that the packet(s) came from. At step 670, the connection between Client A and Client B is established; other sockets in Client A are closed.

Returning to the procedure at step 654, if packet type CLI_REP is not received from client1 on (one or more) sockets, at step 656, the index i is incremented, and at step 658 a determination is made: i<k[g]? If not ("no"), processing continues. Otherwise, for the "yes" case at step 658, control (execution) passes back to step 650. At step 660, the client waits AWAIT_CONNECT milliseconds. At step 662, a determination is made—whether packet type CLI_REP is received from client1 on (one or more) sockets. If "yes," then a connection is established and execution passes to step 670, as explained previously. If "no," indexes are incremented at step 664, and at step 666 a determination is made:

is g<S? If yes, then processing returns to 648. Otherwise, if g<S fails (determination is "no"), then processing continues to step 668. At 668, the process of attempting to establish a connection between client1 and client2 has failed from the perspective of Client A. In one implementation, the process may be repeated programmatically with other values of parameters (e.g., probability Pr, S), or the client or device (or user of such) may decide to re-attempt to make a connection using a same set of values for the parameters.

PARAMETERS. In reference to the equations above and FIG. 4, as for the other parameters, in other implementations, a person skilled in the networking art may select other values and still implement the methods and techniques described herein. For example, S may be set to 1, and K1 ports may be selected from various source ports of client A uniformly distributed in or over the port range [1024,65535]. Alternatively, S may be set to 4, and sequentially may be selected ports from source ports of client A in or over the range [pA,pA+Ki−1], for i=1, . . . , 4. Other values of S, Pr, and other parameters are possible and form a part of this disclosure.

Figure 7:
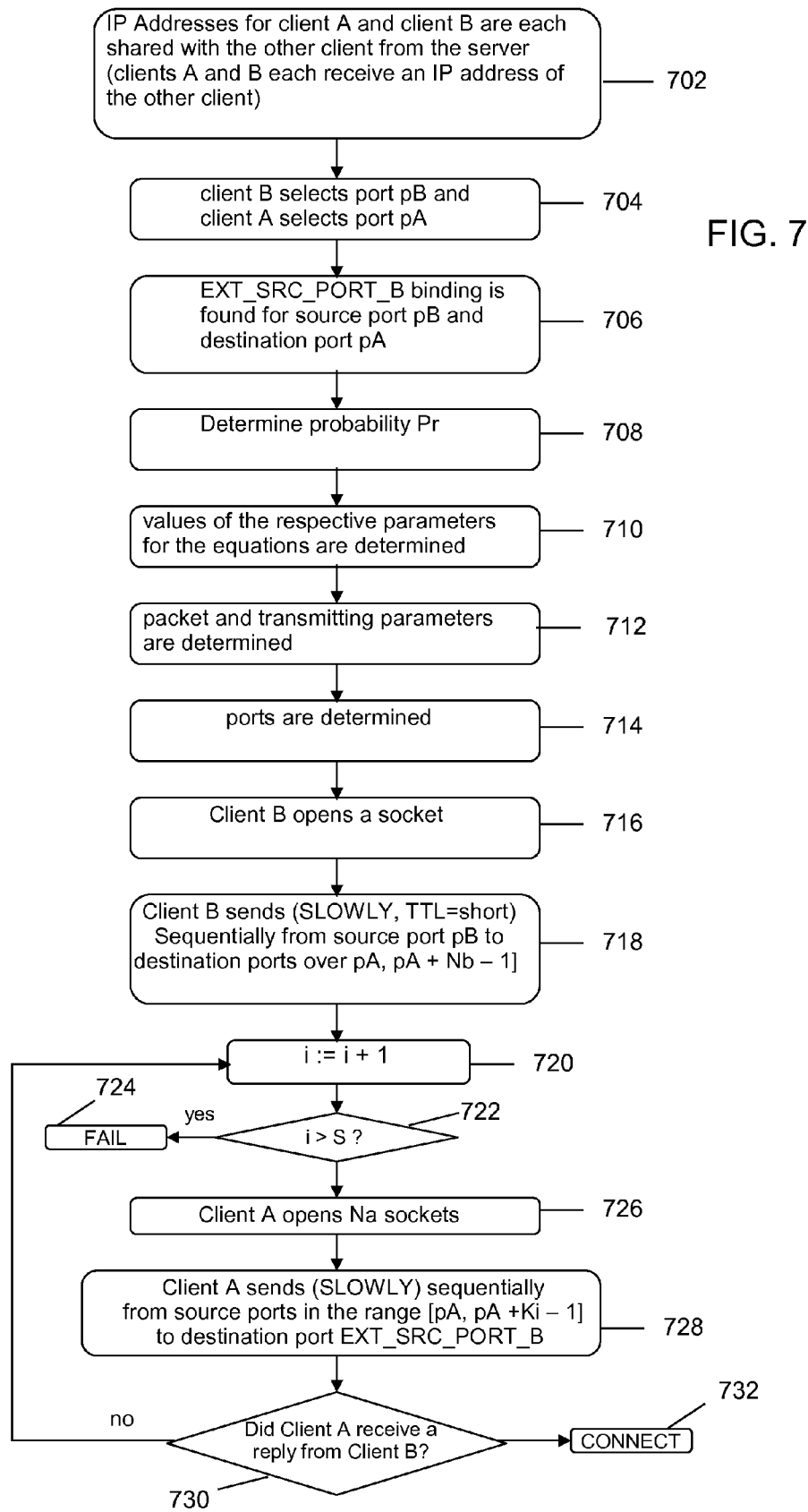
FIG. 7 is a flowchart showing a Type A and Type B NAT traversal method according to one implementation.

FIG. 7 is a flowchart showing a Type A and Type B NAT traversal method according to one implementation. FIG. 7 follows the same scenario as shown in FIG. 4 in which client B originates a connection with client A, shown schematically in FIG. 4. With reference to FIG. 7, at step 702, clients A and B each receive an IP address of the other client. At step 704, client B selects port pB and client A selects port pA. At step 706, the EXT_SRC_PORT_B binding is found, selected or determined for the source port pB and the destination port pA. At step 708, a connection probability Pr is accessed from a memory, selected or determined. For example, this probability is pre-programmed or set without a user selection or designation. For example, this probability may be set to 99%, 99.9% or 99.95%. At step 710, values of the respective parameters of the equations are accessed, selected or determined. For example, these values may be stored in a memory of a device associated with one or more devices in the network topology including in one or more of the client devices. These values may include optimized values for Na, Nb, S, and K1 through Ks (and the like, as described elsewhere herein). These values may be optimized for one or more conditions including, for example, the value of probability Pr, a device type operating a client, a power source of the device operating a client. At step 712 packet and transmitting parameters are accessed, selected or determined. These parameters may include timing parameters or variables such as Short, SLOWLY and pause. Actual values are substituted for the programmable constants or parameters.

At step 714, the ports or port ranges are determined or enumerated for use in performing the steps of the method. For example, for S=4, four sets of port ranges need to be identified and made available to the client instructions operating on a hardware device. At step 716, Client B opens a socket. At step 718, Client B sends (SLOWLY, TTL=short) sequentially from source port pB to destination ports in the range [pA, pA+Nb−1]. At step 720, a iterative process begins for i:=i+1. At step 722, the instructions determine whether i>S. At step 724, if i>S, then the connection attempt (method to connect Client B with Client A) fails and subsequently, for example, returns control to the client(s), communicates a failure to the client(s), or executes other instructions. At step 722, if i is not greater than S (i>S), other steps or instructions are performed. At step 726, for i=1, Client A opens Na sockets (i.e., Na number of sockets). Further, at step 728, Client A sends (SLOWLY) sequentially from source ports in the range [pA, pA+Ki−1] to destination port EXT_SRC_PORTB. At step 730, a condition is checked: Did Client A receive a reply from Client B? If so, at step 732 a connection is established the loop or iteration is exited. Otherwise, the iterative process continues until either a connection between Client B and Client A is established or i is incremented to the point where i>S.

FIG. 8 is a pseudo-code listing or algorithm of a dynamic programming method for optimal partitioning of M into S number of terms. With reference to FIG. 8, at step 802, p_goal>0 is the goal and is the permitted probability of failure (e.g., 0.1, 0.01, 0.001, 0.00052). At step 804, a real array q[0 . . . N] is created. At step 806, q[0]=1. At step 808, q[i]=(1−M/(N−i+1))q[i−1] for i=1, 2, . . . until q[i]<=p_goal is found. In one implementation, the q[i]<=p_goal is guaranteed to be found because q[N−M+1]=0. At step 810, Na=the first index i such that q[i]<=p_goal. At step 812, if q[S]<=p_goal, then the process stops, and an optimal set of series is 1+1+ . . . +1 (Na terms), and the average cost is M+q[0]+q[1]+ . . . +q[Na−1]. At step 814, if such is not the case, then a real array cost[1 . . . S][0 . . . Na], integer array last[1 . . . S][0 . . . Na] and real array c[1 . . . Na−1] are created. At step 816, the cost can be set as cost[j][0]=M, last[j][0]=0 for j=1 . . . S. At step 818, the cost can be expressed as cost[1][i]=M+i, last[1][i]=i for i=1 . . . N. At step 820, a loop is set up such that for j=2 . . . S certain steps are performed (steps 822 through 830). At step 822, another loop is implemented such that for i=0 . . . j−1 the cost is defined as cost[j][i]=cost[j−1][i] until last[j][i]=0. At step 824 another loop is implemented such that for i=j . . . Na steps 826, 828 and 830 are performed. At step 826, for k=j−1 . . . i−1 cost is computed according to c[k]=cost[j−1][k]+(i−k)q[k]. At step 828, k_opt is set such that k_opt=such value of k where c[k] was minimal. At step 830, the cost is defined as cost[j][i]=c[k_opt], last[j][i]=i−k_opt. At step 832, a final value of the average cost is cost[S][Na].

With reference again to FIG. 8, an optimal partitioning of Na into S groups such as k[1]+ . . . k[S] can be expressed according to steps 834 through 840. At step 834, k[S] can be expressed as k[S]=last[S][Na]. At step 836, k[S−1] can be expressed as k[S−1]=last[S−1][Na−k[S]]. At step 838, k[S−2] can be expressed as k[S−2]=last[S−2][Na−k[S]−k[S−1]]. This progression continues until, for example, step 840, where k[1] can be expressed as k[1]=last[1][Na−k[S]−k[S−1]− . . . −k[2]]. In one implementation, a calculated number of packets is sent for each k, i.e., for each batch of salvos to be sent between Client A (404) and Client B (402) as illustrated in FIG. 4.

FIG. 9A is a table showing generated values from various scenarios of starting values for the traversal method according to one implementation—for optimal partitioning of M into S number of terms. A person of ordinary skill in the art should be able extend the table and generate other practical cases as desired or required. With reference to FIG. 9A, for N=32256, S=1 . . . 5, and P=0.9, 0.99 and 0.999, optimal values of M, k[i] and respective average costs are shown in the table. Marked with an asterisk are rows of parameters used in the NAT traversal methods described herein. Generally, as S is increased, the average cost is reduced for a constant value of probability. Also, generally, as probability Pr is increased, the average cost is increased for a constant value of S.

FIG. 9B is a table showing generated IP addresses and port numbers based on the generated values of FIG. 9A according to one implementation for divergent packets originating from client B.

FIG. 9C is a table showing generated IP addresses and port numbers based on the generated values of FIG. 9A according to one implementation for convergent packets originating from client A. The entry marked with an asterisk indicates a successful attempt to make a connection between client B and client A.

FIG. 10 is another table showing generated values from various scenarios of starting values for the traversal method according to one implementation—for optimal partitioning of M into S number of terms. A person of ordinary skill in the art should be able extend the table and generate other practical cases as desired or required. With reference to FIG. 10, for N=64512, S=1 . . . 5, and P=0.9, 0.99 and 0.999, optimal values of M, k[i] and respective average costs are shown in the table. Generally, as S is increased, the average cost is reduced for a constant value of probability. Also, generally, as probability Pr is increased, the average cost is increased for a constant value of S.

PSEUDO CODES. Described next is a set of pseudo code illustrating a particular implementation of the methods described herein. With respect to the pseudo code, a person of ordinary skill may choose different parameters in order to optimize any individual or overall (1) delay needed to establish a communication between two or more clients, (2) the way and ordering in which packets are sent, and (3) the number of packets responded in the series to be used in order to optimize performance, e.g., the time until connection or total number of packets sent from clients.

Embodiments may be implemented in hardware, firmware, software or any combination of such using conventional general purpose or special purpose analog or digital computers programmed according to the teachings herein. Appropriate coding may readily be prepared by programmers based on the teachings herein. Various changes may be made in the description, parameters and timing constraints, the steps and arrangement of the components thereof without departing from the scope and spirit of the techniques disclosed.

According to one example, parameters M=461, N=64512, and Pr is set to 0.999. The port numbers are given in a range. The parameter SLOWLY is set to 150 corresponding to a packet rate in microseconds per packet. This value is calculated to be equal to or greater than the algorithm's packet size in bits divided by the maximum available channel capacity in bits per second. Exceeding this rate can result in the networking equipment (e.g. router, NAT, firewall) triggering a blacklisting event which could prevent establishment of a communication, at least within a reasonable amount of time.

CLI1_PORT is set to 40000, and CLI2 PORT is set to 40000. M is set to 231 where Nb is the number of packets/ports. TM_3A_3B is set to 2000 ms, the time after phase 3a before phase 3b. The parameter S is set to 4. The parameter PHASE_3A_TIME is set to (1.5*(SLOWLY*M)) microseconds. The parameter AWAIT_CONNECT is set to 2000 ms. The parameter AWAIT_CONNECT is the time computed in order to make the algorithm function properly. About 2000 ms is the timing to accommodate contemporary common network delay situations when clients and servers are located in faraway countries. This time is computed to exceed the packet round-trip time between clients with accommodation for server start signal de-synchronization.

The AWAIT_CONNECT parameter must be greater than (A to B delay+latency at B+B to A delay+server start signal synchronization time delta as perceived by clients). The various server-client trip times from Server to A and Server to B need to be accommodated in addition to accommodating for Server transmit buffer flush latency. This is what can cause the start time synchronization error. Additionally, the client port listen polling sampling frequency plays a role in this equation.

The parameter AWAIT_CONNECT is calculated in this manner for the cases when packet numbers are minimized rather than determining AWAIT_CONNECT based on connection time. For minimizing connection time, it is possible to use different values for Na and Nb (i.e., derived with S=1) and to send the entire Nb sequence of packet salvos with intermediate AWAIT_CONNECT=0. Then, the procedure is to wait for AWAIT_CONNECT time computed as per above in order to verify that a connection is established. For this procedure, let k[S]={93, 132, 217, 520}; [Na=sum k[i] for i in [0, S−1] ], let ports_3a [M]=[50000, 50001, . . . , 50000+M−1], and let ports_3b [Na]=[50000, 50001, . . . , 50000+Na−1].

The entries of ports_3a[i] can be initialized with the M elements uniformly distributed within the NAT port range with the first element equal to a given value port0.

One particular way of choosing the port_3a[i] numbers which is effective with currently deployed NATs is to choose the numbers such that the distances between any two consecutive numbers (and between the maximum number and the minimum number increased by N) are approximately the same modulo N, where N is a NAT's available port range. Such a placement of numbers is a well balanced modulo N.

In one implementation of the techniques described, let a NAT's port range be [port_min, port_max]. It contains N=port_max−port_min+1 ports. Let port0 be an initial port number, where port_min<=port0<=port_max. Let M be a number of ports to be selected. Generally, M<N, because otherwise all possible ports are selected. Moreover, typically M is much smaller than N. Denote port1 as equal to port0−port_min. For example, let port_min=1024, port_max=65535. This corresponds to N=65535−1024+1=64512. For example, for port0=50000, then port1=5000−1024=3976).

The following initialization is effective: for (i=0; i<M; i++) set port_3a[i]=port_min+((port1+(i*N)/M) mod N) where "I" represents integer division with rounding down. A more general form of a balanced initialization can be expressed as: for (i=0; i<M; i++) set port_3a[i]=port_min+((port1+(p1+i*N*p2)/M) mod N), where p1 and p2 are any integer constants such that 0<=p1<M, 1<=p2<M, and p2 is mutually prime with M. Selecting p1=0 and p2=1, it is possible to reduce the general method to the initially shown particular variant. For the algorithm with NAT type detection, the entries of ports_3b[i] can be initialized with the arbitrary Na elements from all port numbers within the NAT port range.

For the algorithm without NAT type detection, the entries of ports_3b[i] can be initialized with the arbitrary Na elements without repetitions selected from all port numbers within the NAT port range.

PACKET DESCRIPTION. In conjunction with establishing connections, packet forming may be used to additional advantage. In addition to the standard IP header, the port-dependent (e.g., UDP, TCP) packet may contains the following information.

Parameter GET_NAT_REQ is for a request from a client to a server to get the NAT address and port of the other client. This parameter may be used for the connection methods that use Symmetric NAT detection. The type is GET_NAT_REQ, and includes a unique ID of a client and a local_address:local_port of the client.

Parameter GET_NAT_REP is for a reply from a server to a client with a NAT address and a NAT port of the client. This parameter may be used for the connection methods that use Symmetric NAT detection. The type is GET_NAT_REP, and includes a unique ID of a client, a local_address: local_port of the client, and a nat_address:nat_port of the client.

Parameter SRV_REQ is for a request from a client to a server to get other client information. This parameter may be used for the connection methods that use Symmetric NAT detection. The type is SRV_REQ, and includes a unique ID of a client, a local_address:local_port of client, a nat_address:nat_port of client, and the nat_type of the client.

Parameter SRV_REP is for a reply from a server to a client with other client information. This parameter may be used for the connection methods that use Symmetric NAT detection. The type is SRV_REP, and includes a unique ID of a local_address:local_port of another client, a nat_address:nat_port of the other client, and the nat_type of the other client.

Parameter CLI_REQ is a request from a first client to another one or more clients. The type is CLI_REQ, and includes a unique ID of a sender, a local_address:local_port of the sender, and a nat_address:nat_port of the sender.

Parameter CLI_REP is a reply from a first client to another one or more clients. The type type is CLI_REP, and includes a unique ID of a sender, a local_address:local_port of the sender, and a nat_address:nat_port of the sender.

Optionally, for connection authentication purposes, a Symmetric Key Message Authentication Code (MAC) or a Public Key Digital Signature of all packet data except for this record, or of the cryptographic hash of said packet data, when said MAC Digital Signature is based on a symmetric key negotiated through the server or a public key distributed and authenticated through Information provided by the server. In cases when the received packet's computed MAC or Digital signature mismatches, the value contained in this field, the packet is discarded without any consequences to the operation of this algorithm, except for mismatch logging or statistical counting/sampling for implementations requiring forensic accountability. Additionally, for protection against packet replay, the authenticated data portions of the packets are extended to include non-decreasing counters, separate for each Client-Server or Client-Client communication, and separate for each communication direction (e.g., Client 1->Client 2 uses one counter, whereas Client 2->Client 1 uses a different counter). Whenever a receiving client detects a counter with a value that is equal or smaller than the respective counter for any previously received packet it discards the packet including that counter using the above procedure used when MAC or Digital signature mismatch is detected.

FIG. 11 is a pseudo-code listing or set of algorithms related to establishing a connection via a server, with and without detection of Symmetric NATs. With reference to FIG. 11, at step 1102, a server creates two listen sockets on server_ip:SRV_PORT1 and server_ip:SRV_PORT2. At step 1104, the server waits to receive one or more packets—from one or more clients. At step 106, if (received packet type==GET_NAT_REQ), the algorithm returns packet type GET_NAT_REP. At step 1108, if (received packet type==SRV_REQ), the server returns packet type SRV_REP for one or more other clients (if each of the one or more other clients satisfy nat_type>0).

For establishing a connection without the use of Symmetric NAT detection, at step 1110, a server creates a listen socket on serverip:SRV_PORT1. At step 1114, the server waits to receive one or more packets—from one or more clients. At step 1116, if (received packet type==SRV_REQ), the algorithm returns packet type SRV_REP for one or more other clients (if each of the one or more other clients satisfy nat_type>0).

With reference to FIG. 11, from the perspective of one or more clients, at step 1118, a client generates a unique ID. At step 1120, the client creates a listen socket on CLI_PORT. At step 1122, the client sends one or more packets from local_address:CLI_PORT to server_ip:SRV_PORT1 type GET_NAT_REQ. At step 1124, the client receives one or more packets from server:SRV_PORT1 type GET_NAT_REP and saves nat_address1:nat_port1. At step 126, the client sends one or more packets from local_address: CLI_PORT to server_ip:SRV_PORT2 type GET_NAT_REQ. At step 1128, the client receives one ore more packets from server:SRV_PORT2 type GET_NAT_REP and saves nat_address2:nat_port2. At step 1130, if (nat_port1==nat_port2) nat_type=CONE NAT; otherwise (else in programming parlance) nat_type=SYMMETRIC NAT. At this point, a NAT type should be successfully detected.

FIG. 12 is a pseudo-code listing or set of algorithms illustrating use of Symmetric NAT detection and making a connection between clients according to one implementation. While two clients are expressed, a programmer of ordinary skill in the art could expand this technique to an arbitrary number of clients (e.g., 3, 4, 6, 8). With reference to FIG. 12, at step 1202 clients each detect their respective NAT type. At step 1204, client1 sends packet type SRV_REQ from client1:CLI1_PORT to server_ip: SRV_PORT1. At step 1206, client2 sends packet type SRV_REQ from client2:CLI2_PORT to server_ip: SRV_PORT1. At step 1208, client1 receives packet type SRV_REP with nat type, nat_address:nat_port of client 2. At step 1210, client2 receives packet type SRV_REP with nat type, nat_address:nat_port of client 1.

At step 1212, for the case where (two clients with nat_type==CONE NAT (non-symmetric NAT)), the two clients are each programmed with instructions to perform a method. Steps 1214 through 1224 are performed by Client 1, and steps 1226 through 1236 are performed by Client 2. At step 1214, Client 1 sends packet type CLI_REQ from client1:CLI1_PORT to client2 nat_address:nat_port with short TTL (5). At step 1216, a loop is implemented according to: while (! a packet type CLI_REP received from client2 on client1:CLI1_PORT). At step 1218, Client 1 waits AWAIT_CONNECT milliseconds. At step 1220, Client 1, sends packet type CLI_REQ from client1:CLI1_PORT to client2 nat_address:nat_port with long TTL (64). At step 1222, Client 1 sends packet type CLI_REP from client1: CLI1_PORT to client2 nat_address:nat_port. At step 1224, a connection is established.

At step 1226, Client 2 sends packet type CLI_REQ from client2:CLI2_PORT to client1 nat_address:nat_port with short TTL (5). At step 1228, a loop is implemented according to: while (! a packet type CLI_REP received from client1 on client2:CLI2_PORT). At step 1230, Client 2 waits AWAIT_CONNECT milliseconds. At step 1232, Client 2 sends packet type CLI_REQ from client2:CLI2_PORT to client1 nat_address:nat_port with long TTL (64). Steps 1228, 1230 and 1232 may be repeated in order to get more ports. At step 1234, Client 2 sends packet type CLI_REP from client2:CLI2_PORT to client1 nat_address:nat_port. At step 1236, a connection is established.

At step 1238, for the case where ((one client with nat_type==SYMMETRIC NAT) AND (other client with nat_type==CONE NAT)). At step 1240, if ((nat_type of client1==CONE NAT) AND (nat_type of client2==SYMMETRIC NAT)), at step 1242 CLIENT_S=client2, and at step 1244, CLIENT_C=client1. At step 1246, else if ((nat_type of client1==SYMMETRIC NAT) AND (nat_type of client2==CONE NAT)), at step 1248, CLIENT_S=client1 and CLIENT_C=client2. At step 1250, the instructions include: else goto two_symmetric_nats—for the case where each of the clients is behind a Symmetric NAT.

FIG. 13 is a pseudo-code listing or set of algorithms illustrating steps to be taken by clients behind either a CONE or Symmetric NAT type according to one implementation. Steps 1302 through 1314 are for the case where the Client is behind a CONE NAT. At step 1302, the expression is: CLIENT_C (client with CONE NAT)—also known as Phase 3A. At step 1304 a loop is implemented as follows: for (I=0; i<M; i++) with steps 1306, 1308 and 1310 being performed. At step 1306, port=ports_3a [I]. At step 1308, CLIENT_C sends packet type CLI_REQ from CLIENT_C:CLIENT_C_PORT port to CLIENT_S nat_address:port with short TTL (5). At step 1310, the client waits SLOWLY microseconds. At step 1312, the client waits to receive packet on CLIENT_C:CLIENT_C_PORT. At step 1314, a connection established.

Steps 1316 through 1344 are for the case where the Client is behind a Symmetric NAT. With reference to FIG. 13, at step 1316 the expression is: CLIENT_S (client with SYMMETRIC NAT)—also known as Phase 3B. At step 1318, the client waits PHASE_3A_TIME microseconds for CLIENT_C to finish. At step 1320, the index j is set according to: j=0. At step 1322, a loop is implemented as follows: for (g=0; g<S; g++). At step 1324, another loop is implemented as follows: for (i=0; i<k[g]; i++). At step 1326, port=ports_3b [i+j]. At step 1328, the client creates a "listen" socket on local_address:port. At step 1330, CLIENT_S sends packet type CLI_REQ from local_address:port to nat_address:nat_port of CLIENT_C. At step 1332, the client waits SLOWLY microseconds. At step 1334, if (a packet type CLI_REP received from CLIENT_C on CLIENT_S sockets) further instructions are executed. At step 1336, a reply is sent from the socket which received a CLI_REP packet to the address and port that the packet came from. At step 1338, the client closes other sockets. At step 1340, a connection is established. At step 1342, the instructions exit. At step 1344, the client waits AWAIT_CONNECT milliseconds to receive packet type CLI_REP from CLIENT_C on CLIENT_S sockets. At step 1346, if (a packet type CLI_REP received from CLIENT_C on CLIENT_S sockets), other steps are executed. At step 1348, a reply is sent from the socket which received a CLI_REP packet to the address and port that the packet came from. At step 1350, the client closes all other sockets. At step 1352, a connection established. At step 1354, the instruction executes an exit call. At step 1356, parameter j is incremented according to: j+=k[g]. As instructed, at step 1358, a FAIL routine is called or executed.

AIMING. According to one implementation, Phase 3A is a "divergent aiming" and Phase 3B is a "Convergent Aiming." In an implementation of the method with NAT detection, there can be several variants according to the following schemes. Variant 1. If there is not a Symmetric NAT present, then perform Phase 3A (divergent aiming) using one or more packets (per salvo) with short TTLs. If there is a Symmetric NAT present, then perform Wait for 3A equivalent time, then perform Phase 3B (convergent aiming) using one or more packets (per salvo) using long TTLs. Variant 2. If there is a Symmetric NAT present, then perform Phase 3B (convergent aiming) using one or more packets (per salvo) with short TTLs. If there is not a Symmetric NAT present, then perform Wait for 3B equivalent time, then perform Phase 3A (divergent aiming) using one or more packets (per salvo) with long TTLs.

Method Without NAT Detection. Each client can perform the same process according to one or more variations for any given connection attempt. For example, Variant 1 includes using Phase 3A using short TTLs and Phase 3B using long TTLs. Variant 2 includes using Phase 3B using short TTLs and Phase 3A using long TTLs.

When the clients use different processes, one or more variations may be performed. For example, Variant 3 includes, for Client 1: performing Phase 3A using short TTLs and performing Phase 3B using long TTLs; for client 2: performing Phase 3B using short TTLs and performing Phase 3A using long TTLs. For Variant 4, Client 1 includes using Phase 3B using short TTLs and Phase 3A using long TTLs, and for Client 2 includes using Phase 3A using short TTLs and Phase 3B using long TTLs. For the first client, there may be either S1 or L1 packets—the "S" referring to short packets and the "L" to long packets, and the number 1 referring to client 1. For the second client, there may be either S2 or L2 packets. Thus, scenarios of sending packets between the first client and the second client include permutations of S1, S2, L1 and L2. In practice, generally, in order to establish a connection, it is necessary to send S and L packets. That is, in order to establish a connection, an S1 packet must "connect" with an L2 packet, or an S2 packet must connect with an L1 packet. With reference to the mathematical problem, M is generally associated with short TTL packets, and K is associated with long TTL packets. However, this need not be the case. Without numbering the packets from the first and second clients, from the perspective of any given NAT in the sequence of NATs along a network between the two clients, a queue of packets may be received over time in a variety of ways. In a first example, a queue Q1=S1, S1, S1, L1, S2, S2, L2, L2, L2, L2, and L2. Maybe zero or one pair of these packets may lead to a connection between the two clients—such as at this NAT. In a second example, a queue Q2=S1, S1, S1, L1, L2, L2, L1, L1, L2, and L2. As can be seen in Q2, the S2 packets do not reach this NAT due to a short TTL associated with the S2 packets. However, a connection may be established based on at least the S1 and L2 packets. In yet another example, a queue Q3=L1, L1, L2, L2 and L2; that is, L1 and L2 packets arrive and are relayed by this particular NAT. In this example, no short packets arrive at this NAT, and accordingly, no connection can be established at this NAT.

Further, while herein a method may be described as, or suggest, sending a single batch of short TTL packets (S type packets), the S packets may be sent in batches. Thus, in terms of timing, it may occur in principle and in practice where a client may interleave or mix the order of sending packets. As an example where there are four S packets and four L packets, the sequence may be represented as: S1, L1, S2, S3, L2, L3, S4, and L4, or any permutation of X number of S packets, and Y number of L packets. Generally, in order to establish a connection, at least one S packet must be sent from a first client, before an L packet arrives from a second client. An S packet of the first client opens a port in a NAT for the L packet of the second client to pass through. In one implementation, an interleaving may be determined for a first client by finding a number of short packets to send from the first client before sending a first long packet. This number may be referred to as $N_{si}$ (referring to "start interweaving"). In this implementation, $N_{si}$ may be based on one or more factors including a time of flight (TOF) between the first client and any given NAT in the network path, a rate of firing of packets from the first client, a rate of firing of the second client, number of salvos or batches of salvos from the first client, and number of salvos or batches of salvos from the second client. For any given desired number of salvos or packets sent from the first client, a variable that may be used for the first client is an amount of interleave of S packets with L packets and is defined as a number of changes from sending one or more S packets to sending one or more L packets and number of changes from sending one or more L packets to sending one or more S packets. This "interleave" factor may be varied as desired or may be optimized to meet one or more conditions such as to minimize a time connection or minimize a number of packets before making a connection.

FIG. 14 is another pseudo-code listing or set of algorithms illustrating making a connection between clients according to one implementation. According to one implementation, the steps shown in FIG. 14 are performed by each client. With reference to FIG. 14, at step 1402, a client generates unique ID. At step 1404, the client creates a listen socket on local port (CLI1_PORT or CLI2_PORT). At step 1404 the client sends packet type SRV_REQ from local_address: local_port to server_ip:SRV_PORT1 and receives packet type SRV_REP with nat_address:nat_port of other client. At step 1408, the client can try a STUN-like UDP hole punching method—such as the one shown in FIG. 12. At step 1410, the client sends packet type CLI_REQ from local_address:local_port to nat_address:nat_port of other client with short TTL (5). At step 1412, a client waits AWAIT_CONNECT milliseconds. At step 1414, if (a packet from other client is received on local_address:local_port), execution goes to "goto DONE" at step 1416, where the DONE instructions are illustrated in FIG. 15. At step 1418, a client sends packet type CLI_REQ from local_address:local_port to nat_address:nat_port of other client with short TTL (5). At step 1420, a client waits AWAIT_CONNECT milliseconds. At step 1422 if (a packet from other client is received on local_address:local_port), execution passes to step 1424 which includes an instruction togoto DONE. At step 1426, the client sends packet type CLI_REQ from local_address: local_port to nat_address:nat_port of other client with long TTL (64). At step 1428, the client waits AWAIT_CONNECT milliseconds. At step 1430, if (a packet from other client is received on local_address:local_port), execution passes to "goto DONE" at step 1432. At step 1434, the client sends packet type CLI_REQ from local_address:local_port to nat_address:nat_port of other client with long TTL (64). At step 1436, the client waits AWAIT_CONNECT milliseconds. At step 1438, if (a packet from other client is received on local_address:local_port), execution passes to "goto DONE" at step 1440.

FIG. 15 is another pseudo-code listing or set of algorithms further illustrating making a connection between clients according to one implementation. With reference to FIG. 15, algorithms for Phase 3A and Phase 3B are illustrated. Steps 1502 through 1518 illustrate Phase 3A. At step 1502, a loop is implemented according to: for (i=0; i<M; i++). At step 1504, port=ports_3a [i]. At step 1506, execution of the processor-executable instructions sends packet type CLI_REQ from local_address:local_port to other client nat_address:port with short TTL (5). At step 1508, execution waits SLOWLY microseconds. At step 1510, if (a packet from the other client is received on local_address: local_port), execution passes to step 1512 where execution passes to "goto DONE," which routine is explained below in reference to steps 1548 through 1554. At step 1514, execution waits TM_3A_3B milliseconds. At step 1516, if (a packet from other client is received on local_address: local_port), execution passes to step 1518, which is goto DONE.

Steps 1520 through steps 1544 illustrate Phase 3B. At step 1520, which is as follows: j=0. At step 1522, a loop is implanted for (g=0; g<S; g++) and includes at least steps 1524 through 1536. At step 1524 a look is implemented as follows: for (i=0; i<k[g]; i++). At step 1526, port=ports_3b [i+j]. At step 1528, execution of the instructions creates a "listen" socket on local_address:port. At step 1530, execution sends packet type CLI_REQ from local_address:port to other client nat_address:nat_port. At step 1532 execution waits SLOWLY microseconds. At step 1534 if (a packet type CLI_REP is received from CLIENT_C on CLIENT_S sockets), further steps are taken such as step 1536. At step 1536, execution passes to "goto DONE," which is explained further below. At step 1538, execution waits AWAIT_CONNECT milliseconds to receive packet from one or more other clients on sockets. At step 1540, if (a packet type CLI_REP is received from other client on local sockets), one or more further steps are taken such as step 1542, which is "goto DONE." At step 1544, index j is incremented as follows: j+=k[g]. At step 1546, as the logic dictates, execution may FAIL to establish connection. At some point, execution may be passed back to the calling routine(s) by an Exit statement.

A DONE function or set of instructions may be called when a connection is established or for some other reason. In one example, and with reference to FIG. 15, DONE includes steps 1548 through 1554. Execution of DONE usually implies that a connection has been established. Step 1548 includes forming and/or sending a reply from the socket which received one or more CLI_REP packets to the address and port from which the packet(s) came from. At step 1550, execution closes all other sockets. Step 1552 indicates that a connection is now established; such step may include making an announcement, change or indication via a graphical or other type of user interface. For example, a sound may be played, a light may be illuminated or flashed, or an icon may be changed or illuminated. At step 1554, execution may include an Exit function or call.

Figure 16:
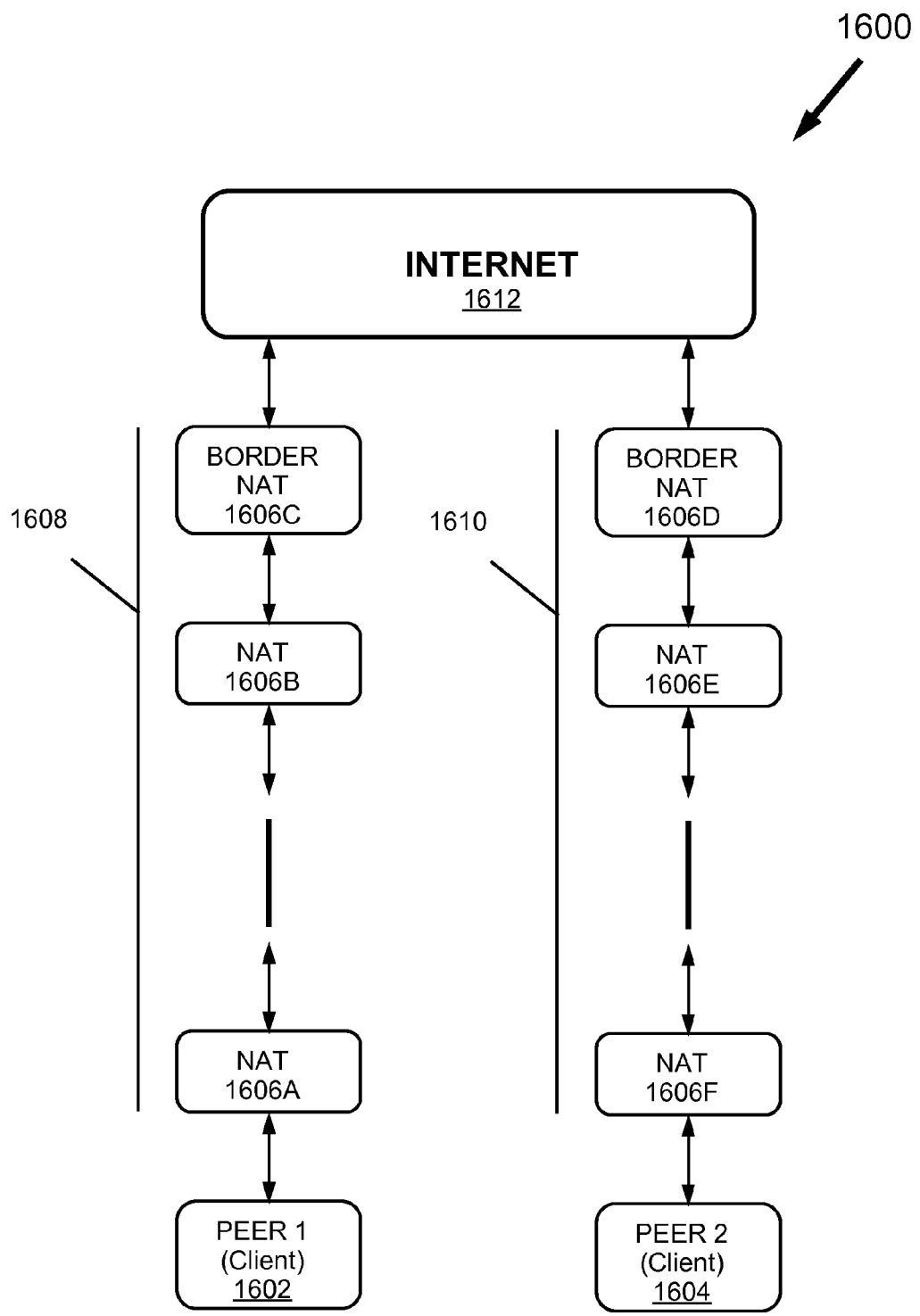
FIG. 16 shows an example of a network topology across which two or more clients may establish direct communications according to one implementation.

FIG. 16 shows an example of a network topology across which two or more clients may establish direct communications according to techniques described herein. With reference to FIG. 16, a first peer (Peer 1) or client 1602 is in communication with one or more NATs such as a first NAT 1606A. In turn, the first NAT 1606A is in communication with one or more other NATs such as a second NAT 1606B, which in turn is in connection with a border NAT 1606C. The first border NAT 1606C is in communication via devices associated with the Internet 1612 with another or second border NAT 1606D. The series of NATs associated with the first Peer 1602 is referred to as NAT set 1 (1608). The series of NATs between devices of the Internet and Peer 2 1604, is referred to as NAT set 2 (1610). In turn, the second border NAT 1606D is in communication with one or more NATs of NAT set 2 (1610). NAT set 2 (1610) includes a border NAT 1606D, NAT 1606E and NAT 1606F. Peer 2 is in communication with the last NAT 1606F in the sequence. According to one implementation, a symmetric NAT may only appear one or more times in either the first NAT set (1608) or the second NAT set (1610). This implementation describes cases two and three as described above. Other implementations are possible and are described elsewhere herein in reference to cases one and four.

Figure 17:
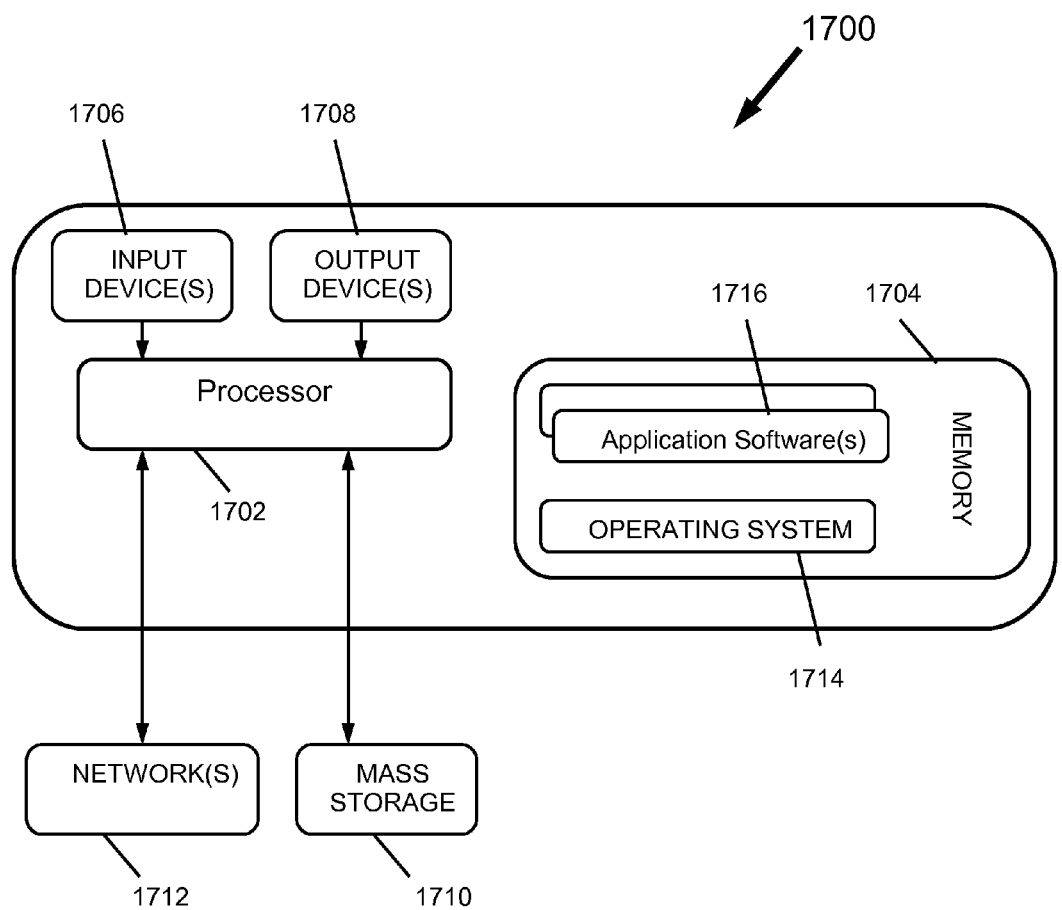
FIG. 17 shows an example of hardware that may be used to implement the techniques described herein according to one implementation.

FIG. 17 shows an example of hardware 1700 that may be used to implement the techniques described herein—such as to operate a software-, firmware- and/or hardware-based client. It is within the techniques to use sockets and other network-related implementations based on the disclosure. It is also within the techniques to make connections by making electronic circuits or "circuitry" wired or programmed to perform the steps described. Further, the techniques may be implemented with not just a single device, but with a combination of two or more devices where discussion or claim is to a single client or single device. Yet further, the techniques may be implemented in one or more components or devices that may hand off or act as a "client" until a connection is made. For example, the techniques may be implemented in a router, mobile phone, one or more chips created for such purpose, a component of a vehicle, a radio transmitter/receiver, a digital computer without an operating system, and with an operating system that does not use network sockets.

While many software implementations are possible, it is possible to use a ROM or other type of chip to store instructions that can be used to perform one or more of the techniques performed herein. As one example, it is possible to create one or more tables that include a series of: source ports, destination ports, destination IP addresss, TTL values, and pause values in order to achieve a useful result. In addition, the one or more tables can be useful if rearranged or accessed in any row and/or column order. According to the example, a connection to another client may be attempted by replacing a destination IP address with a new client's destination IP address. In another example, whether in software, firmware, circuitry or hardware, it is possible to create a table with N rows of local_port, destination_IP_address, destination_port and one or more pieces of information to be used as "packet_content." Through the use of this second example table, fewer calculations may be needed to attempt a connection between a first client and a second client. One or more tables may be generated or used by either a first client, a second client or a combination of tables at or by a first client and a second client.

Referring to FIG. 17, a hardware 1700 could include at least one processor 1702 coupled to a memory 1704. The processor 1702 may represent one or more processors (e.g. microprocessors), and the memory 1704 may represent random access memory (RAM) devices comprising a main storage of the hardware 1700 and any supplemental levels of memory, e.g., cache memories, non-volatile or back-up memories (e.g. programmable or flash memories), read-only memories, etc. In addition, the memory 1704 may be considered to include memory storage physically located elsewhere in the hardware 1700, e.g. any cache memory in the processor 1702 and any storage capacity used as a virtual memory, e.g., as stored on a mass storage device 1710.

The hardware 1700 also typically receives a number of inputs and outputs for communicating information externally. For interfacing with a user or operator, the hardware 1700 may include one or more user input devices 1706 (e.g., a keyboard, a mouse, imaging device, scanner, etc.) and a one or more output devices 1708 (e.g., a Liquid Crystal Display (LCD) panel, a sound playback device (speaker)). To embody the present invention, the hardware 1700 must include at least one display or interactive element (for example, a touch screen), an interactive whiteboard or any other device which allows the user to interact with a computer by touching areas on the screen.

For additional storage, the hardware 1700 may also include one or more mass storage devices 1710, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 1700 may include an interface with one or more networks 1712 (e.g., a local area network (LAN), a wide area network (WAN), a wireless network, and/or the Internet among others) to permit the communication of information with other computers coupled to the networks. It should be appreciated that the hardware 1700 typically includes suitable analog and/or digital interfaces between the processor 1702 and each of the components 1704, 1706, 1708, and 1712 as is well known in the art.

The hardware 1700 operates under the control of an operating system 1714, and executes various computer software applications, components, programs, objects, modules, etc. to implement the techniques described above. In particular, the computer software applications will include the client dictionary application, in the case of the client user device 102. Moreover, various applications, components, programs, objects, etc., collectively indicated by reference 1716 in FIG. 17, may also execute on one or more processors in another computer coupled to the hardware 1700 via a network 1712, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

Figure 18A:
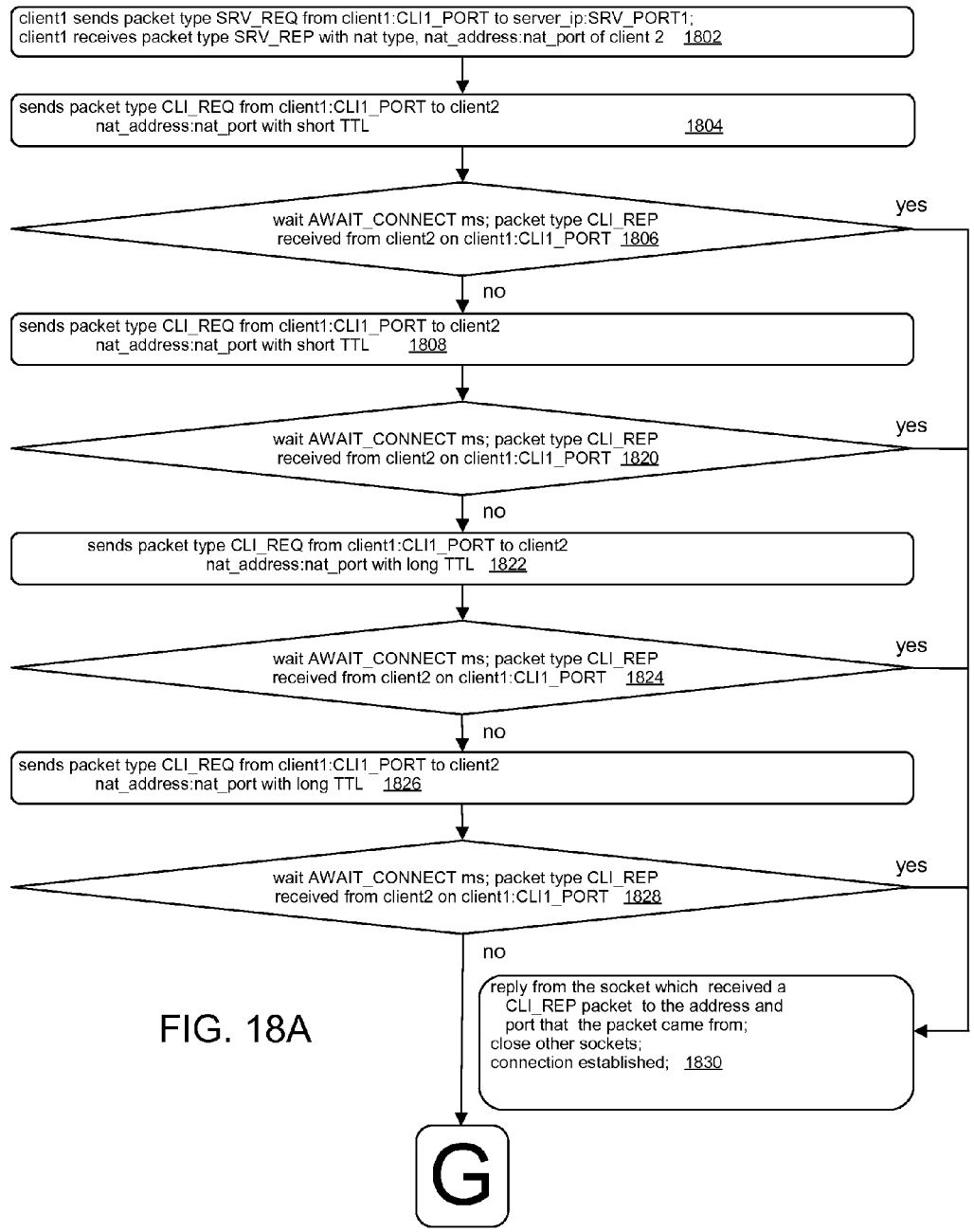
FIG. 18A is a first portion of a flowchart from the perspective of a first client without the use of NAT detection according to one implementation.
Figure 18B:
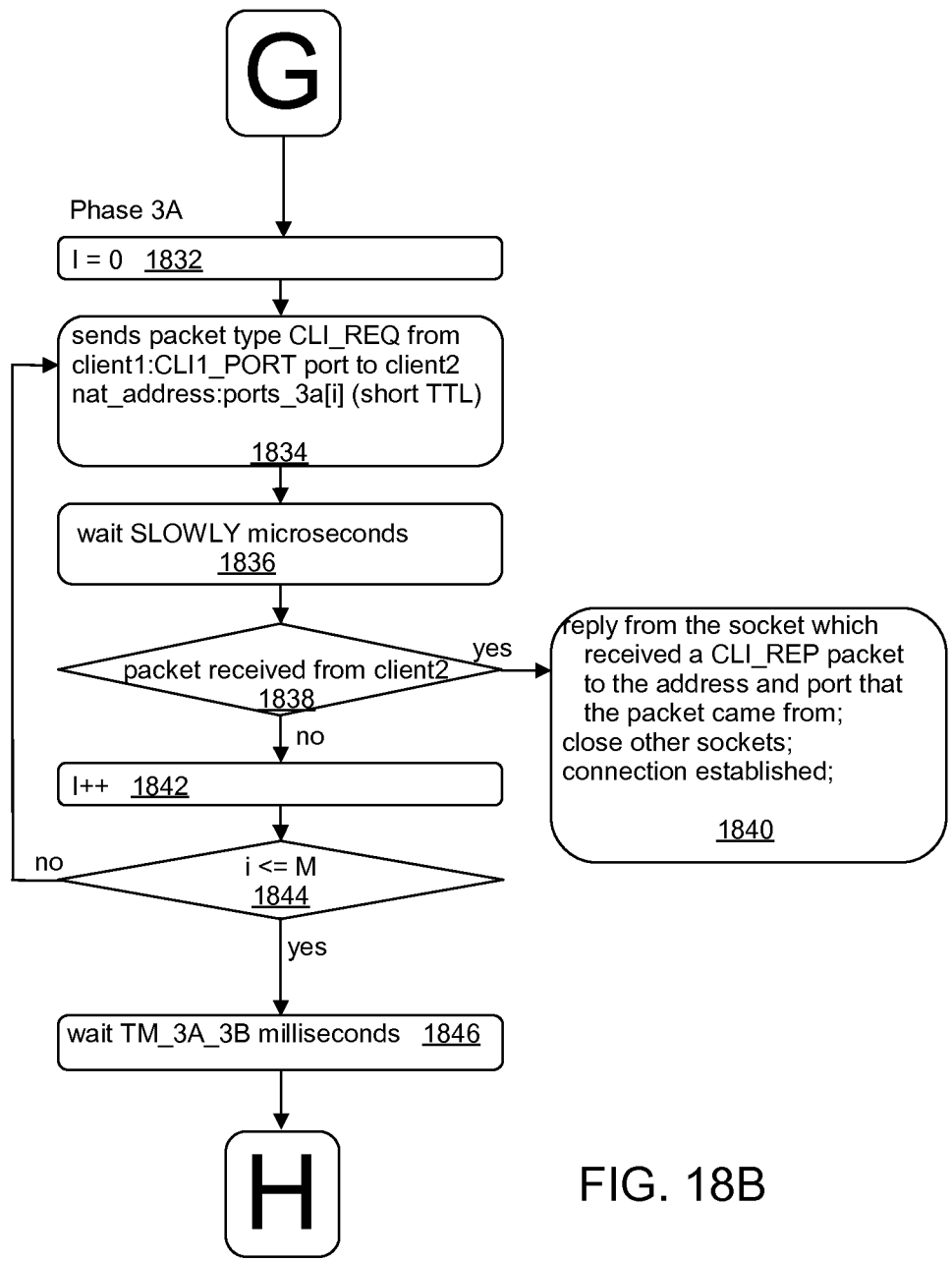
FIG. 18B is a second portion of a flowchart from the perspective of a first client without the use of NAT detection according to one implementation.
Figure 18C:
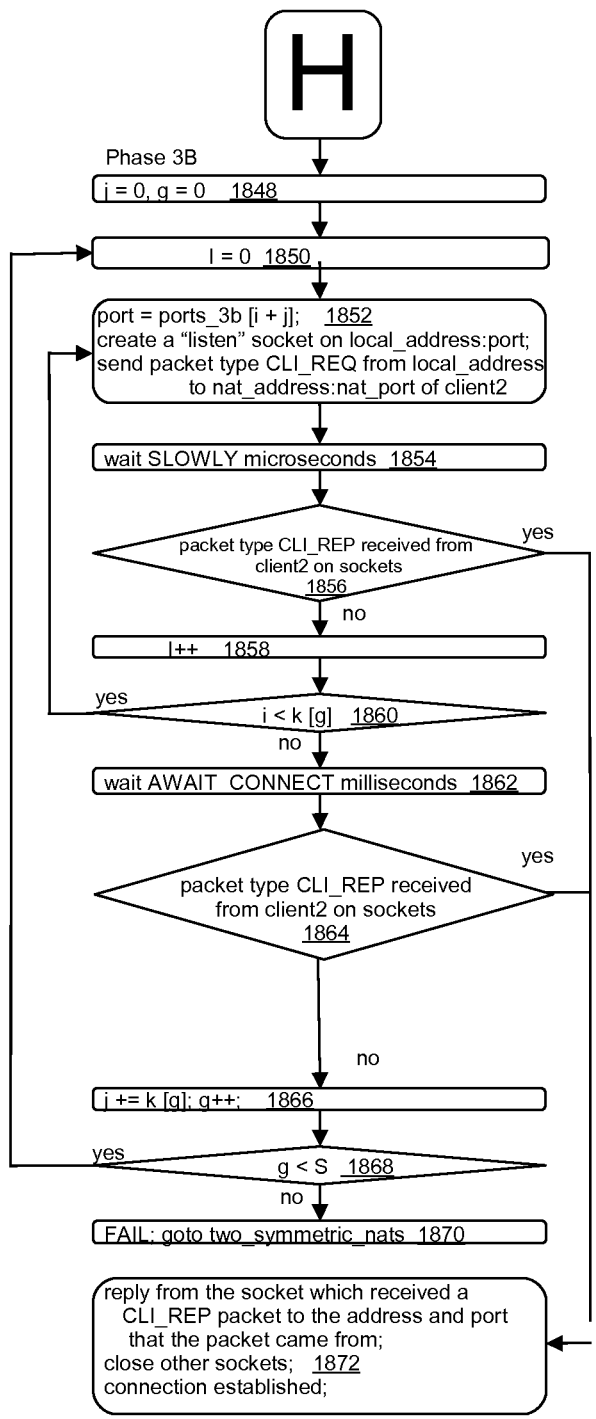
FIG. 18C is a third portion of a flowchart from the perspective of a first client without the use of NAT detection according to one implementation.

FIG. 18A is a first portion of a flowchart from the perspective of a first client without the use of NAT detection according to one implementation. FIG. 18B is a second portion of a flowchart from the perspective of a first client without the use of NAT detection according to one implementation. FIG. 18C is a third portion of a flowchart from the perspective of a first client without the use of NAT detection according to one implementation. These three figures follow a similar format as shown in FIGS. 6A, 6B and 6C. The steps of FIGS. 18A, 18B and 18C have been numbered for the sake of convenience. Further description of these figures is not provided as one of ordinary skill in the art would be able to apply the principles and techniques shown therein.

Figure 19A:
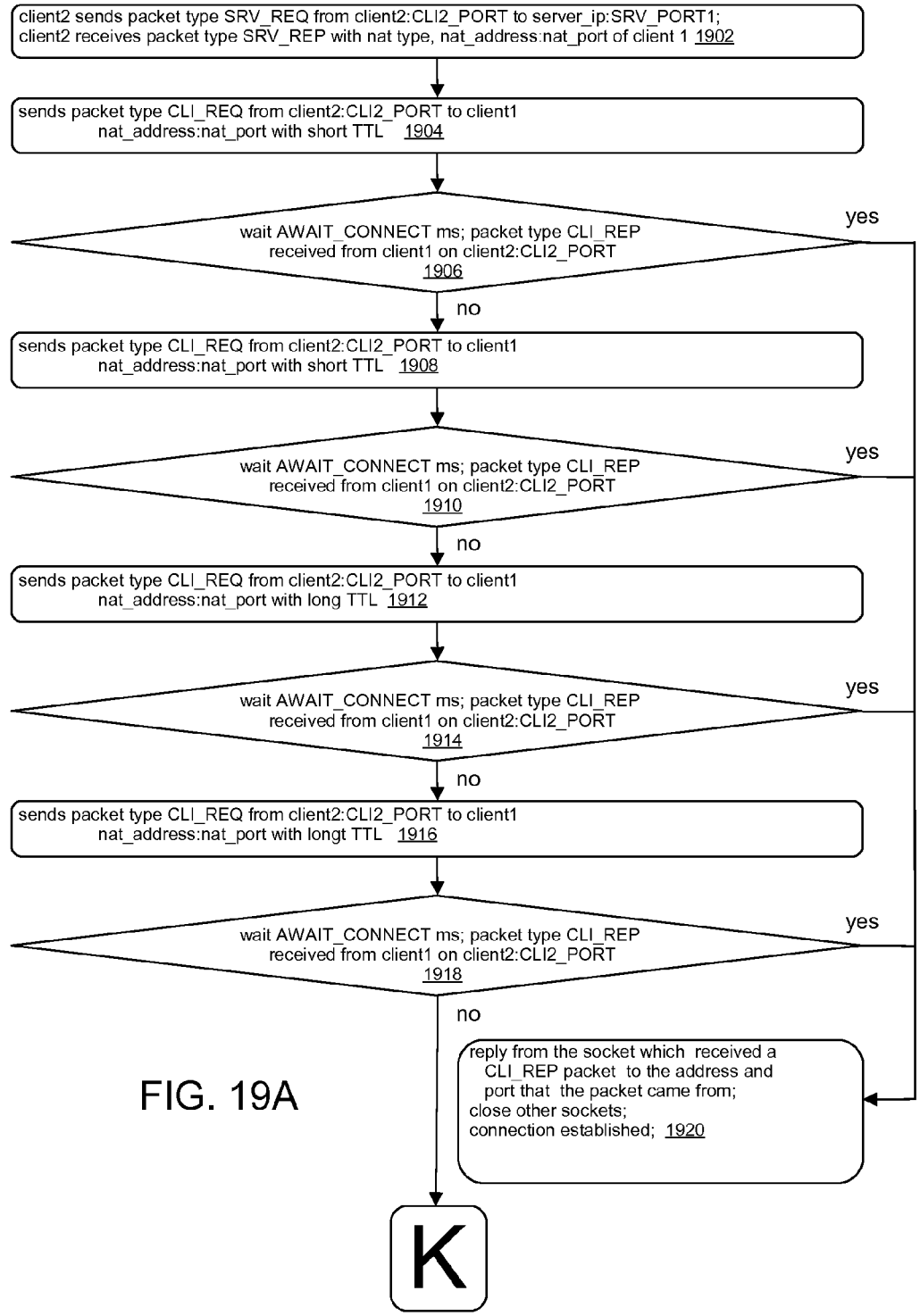
FIG. 19A is a first portion of a flowchart from the perspective of a second client without the use of NAT detection according to one implementation.
Figure 19B:
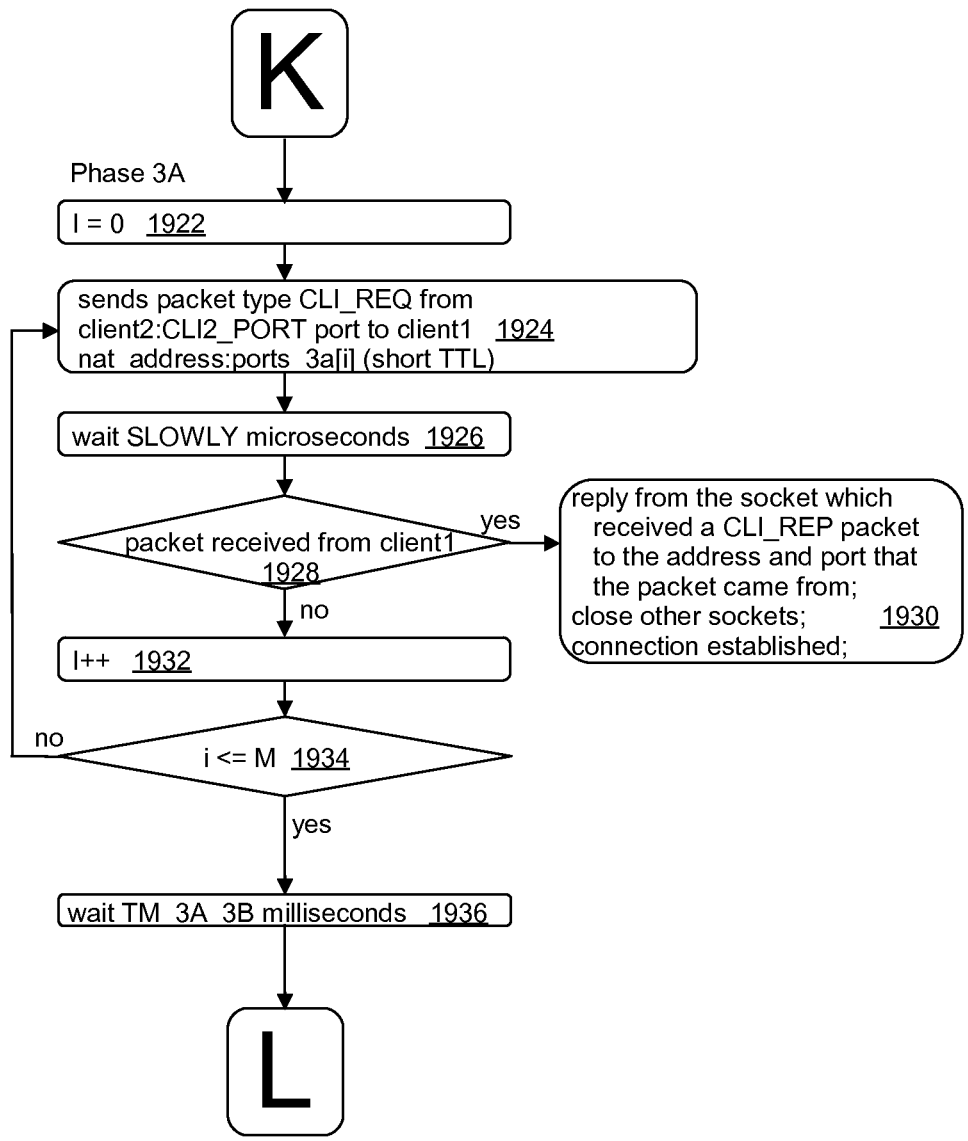
FIG. 19B is a second portion of a flowchart from the perspective of a second client without the use of NAT detection according to one implementation.
Figure 19C:
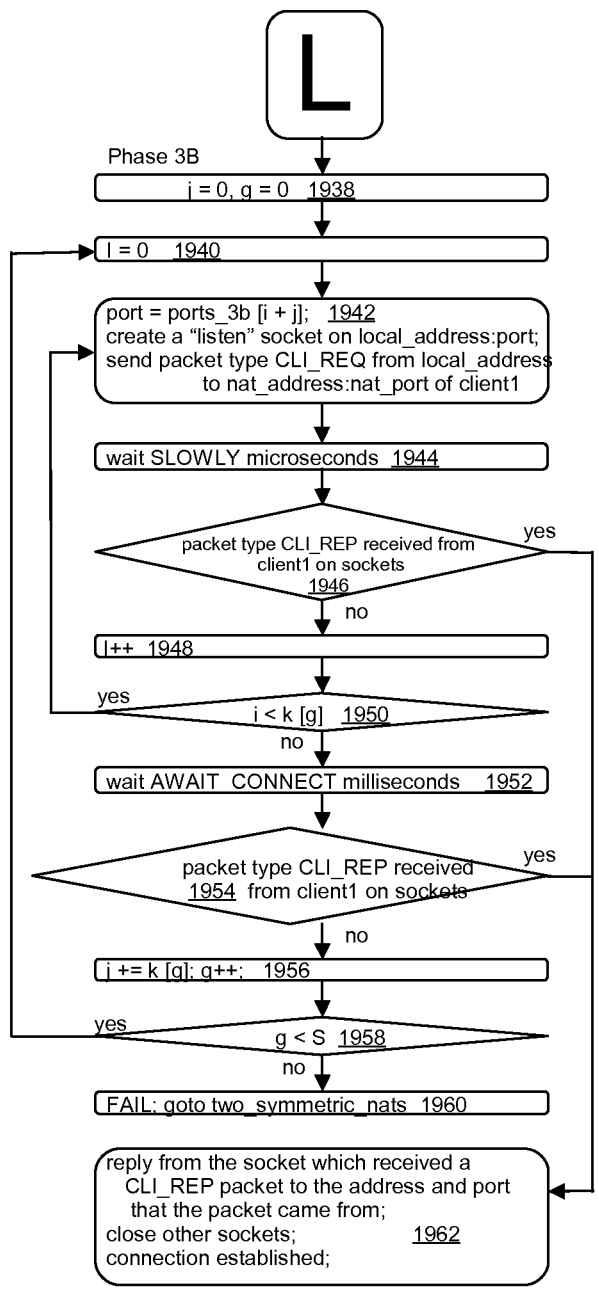
FIG. 19C is a third portion of a flowchart from the perspective of a second client without the use of NAT detection according to one implementation.

FIG. 19A is a first portion of a flowchart from the perspective of a second client without the use of NAT detection according to one implementation. FIG. 19B is a second portion of a flowchart from the perspective of a second client without the use of NAT detection according to one implementation. FIG. 19C is a third portion of a flowchart from the perspective of a second client without the use of NAT detection according to one implementation. These three figures follow a similar format as shown in FIGS. 6A, 6B and 6C. The steps of FIGS. 19A, 19B and 19C have been numbered for the sake of convenience. Further description of these figures is not provided as one of ordinary skill in the art would be able to apply the principles and techniques shown therein.

CONCLUSION. In the description, for purposes of explanation, specific details are set forth in order to provide an understanding of the disclosed technology. It should be apparent, however, to one skilled in the art that the technology and techniques can be practiced without these specific details. In other instances, structures, devices, systems and methods are shown only in block diagram form in order to avoid obscuring the invention.

It is to be understood that the specific order or hierarchy of steps in the foregoing disclosed methods are examples of approaches. Based upon design preferences, it is to be understood that the specific order or hierarchy of steps in the method can be rearranged while remaining within the scope of the disclosed technology. The claims present various steps in a sample order, and the claimed steps are not meant to be limited to the specific order or hierarchy presented.

Reference in this specification to "one embodiment", "an embodiment", or "implementation" means that a particular feature, structure, or characteristic described in connection with the embodiment or implementation is included in at least one embodiment or implementation. Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be evident that the various modification and changes can be made to these embodiments without departing from the broader spirit of the disclosed technology. In an area of technology such as this, where growth is fast and further advancements are not easily foreseen, the disclosed embodiments may be readily modifiable in arrangement and detail as facilitated by enabling technological advancements without departing from the principles of the present disclosure.

We claim:

1. A network traversal system for establishing a direct connection between two clients separated by two or more NAT's across a network wherein at least one of the NAT's is a symmetric NAT, the system comprising:
    a first client behind at least one symmetric NAT in a first LAN, the first LAN connected to the network, and wherein the first client is configured with instructions to cause the first client to:
    identify a plurality of destination ports of a second client;
    detect a signal for sending packets to the second client;
    after detecting the signal, send onto the network one or more packets to each of the identified plurality of destination ports of the second client from a source port of the first client, wherein said packets from the first client make available potential IP address:port combinations for directly connecting the first client with the second client;
    establish a socket for receiving packets from the second client;
    after detecting the signal, listen at the established socket for at least a listen period for receipt of one or more packets from a source port of the second client;
    record in memory an indication of successful receipt of a packet from the second client when one or more packets are received by the first client from the second client within the listen period;
    and generate a signal indicating successful receipt of the packet from the source port of the second client; and
    the second client not behind any symmetric NAT in a second LAN, the second LAN connected to the network, and wherein the second client is configured with instructions to cause the second client to:
    identify a plurality of source ports of the second client;
    detect a signal for sending packets to the first client;
    after detecting the signal, send onto the network one or more packets from each of the identified plurality of source ports to a destination port of the first client at least partially within the listen period associated with the first client; and listen for and detect a signal indicating a successful direct connection between the second client and the first client, wherein the direct connection includes (1) an IP address:port combination for use by the first client to reach the second client and (2) another IP address:port combination for use by the second client to reach the first client.

2. The network traversal system of claim 1, wherein the destination ports are identified randomly over a range of possible destination ports.

3. The network traversal system of claim 1, wherein the destination ports are determined within a subset of destination ports from a range of possible destination ports.

4. The network traversal system of claim 1, wherein the packets sent from the first client are sent with a short TTL ("S" packets).

5. The network traversal system of claim 1, wherein the packets sent from the second client are sent with a long TTL ("L" packets).

6. The network traversal system of claim 1, wherein the second client is further configured to:
    send the one or more packets in batches;
    wait a predetermined amount of time between batches; and
    during the waiting, listen for a signal from the first client that the connection between the first client and the second client has been made.

7. The network traversal system of claim 1, wherein the said signal indicating the successful connection includes one or more packets sent from the first client to the second client.

8. The network traversal system of claim 1, wherein the said signal indicating the successful connection includes one or more packets sent from the second client to the first client.

9. The network traversal system of claim 1, wherein the signal for sending packets for the first client and the signal for sending packets for the second client originate from a server in electronic communication with the first client and in electronic communication with the second client.

10. The network traversal system of claim 1, wherein the signal for sending packets for the first client and the signal for sending packets for the second client respectively include a timestamp at which time the first client is to begin executing its other instructions and at which time the second client is to begin executing its other instructions.

11. The network traversal system of claim 1, wherein the first client is further configured with instructions to receive a NAT type of the first client after detecting the signal for sending packets for the first client.

12. The network traversal system of claim 11, wherein the second client is further configured with instructions to receive a NAT type of the second client after detecting the signal for sending packets for the second client.

13. The network traversal system of claim 1, wherein the packets sent from the first client include packets sent with a short TTL ("S" packets) and packets sent with a long TTL ("L" packets).

14. The network traversal system of claim 13, wherein the S packets and the L packets that are sent from the first client are interleaved one with another such that at least one S packet is sent after the first client sends at least one L packet.

15. The network traversal system of claim 14, wherein the first L packet is sent after N1 number of S packets, wherein N1 is based on a network latency factor available to the first client.

16. The network traversal system of claim 13, wherein the S packets are sent first, wherein the L packets are sent second, wherein the L packets are sent in batches, and wherein the first client is further configured with instructions to wait at least a wait period of time and to listen between batches for a signal that the connection between the first client and the second client has been made.

17. The network traversal system of claim 16, wherein the signal that the connection has been made includes receiving at least one packet from the second client from one of the determined source ports and wherein the at least one packet is sent by the second client.

18. The network traversal system of claim 1, wherein the packets sent from the second client include packets sent with a short TTL ("S" packets) and packets sent with a long TTL ("L" packets).

19. The network traversal system of claim 18, wherein the S packets and the L packets that are sent from the second client are interleaved one with another such that at least one S packet is sent after the second client sends at least one L packet.

20. The network traversal system of claim 19, wherein the first L packet is sent after N2 number of S packets, wherein N2 is based on a network latency factor available to the second client.

21. The network traversal system of claim 18, wherein the S packets are sent first, wherein the L packets are sent second, wherein the L packets are sent in batches, and wherein the second client is further configured with instructions to wait at least a wait period of time and to listen between batches for a signal that the connection between the first client and the second client has been made.

22. The network traversal system of claim 21, wherein the signal that the connection has been made includes receiving at least one packet from the first client from one of the source ports of the first client and sent by the first client.

23. The network traversal system of claim 1, wherein the packets sent from the first client include packets sent with a short TTL ("S" packets) and packets sent with a long TTL ("L" packets), and wherein the packets sent from the second client include packets sent with a short TTL ("S" packets) and packets sent with a long TTL ("L" packets).

24. The network traversal system of claim 23, wherein the S packets and the L packets that are sent from the first client are interleaved one with another such that at least one S packet is sent after the first client sends at least one L packet, and wherein the S packets and the L packets that are sent from the second client are interleaved one with another such that at least one S packet is sent after the second client sends at least one L packet.

25. The network traversal system of claim 24, wherein the first L packet sent by the first client is sent after N1 number of S packets, wherein the first L packet sent by the second client is sent after N2 number of S packets, and wherein N1 and N2 are based on at least one network latency factor.

26. The network traversal system of claim 25, wherein the network latency factor is derived from information sent to either the first client or the second client from a server that is in electronic communication with the first client and with the second client on the network.

27. The network traversal system of claim 23, wherein the S packets are sent first from both the first client and from the second client (respectively), wherein the L packets are sent second from both the first client and from the second client (respectively), wherein the L packets are sent in batches from each of the first client and the second client, and wherein the first client and the second client each waits a predetermined time and listens between batches for a signal that the connection between the first client and the second client has been made.

28. The network traversal system of claim 27, wherein the signal that the connection has been made includes receiving at one of the clients at least one packet from the other client.

29. The network traversal system of claim 1, wherein the first client is a device.

30. The network traversal system of claim 1, wherein the first client is a circuit.

31. The network traversal system of claim 1, wherein the first client is at least one software application operating in user space.

32. The network traversal system of claim 1, wherein the first client is behind a non-symmetric NAT from a perspective of the second client, and wherein the second client is behind a symmetric NAT from a perspective of the first client.

33. The network traversal system of claim 1, wherein the first client is further configured with instructions to acquire an IP address of a NAT of the second client before determining the series of destination ports.

34. The network traversal system of claim 1,
wherein the first client is further configured with instructions to acquire an IP address of the second client ("second IP address") before sending onto the network said packets to each of the determined series of destination ports, wherein said acquired second IP address is included in said packets of the first client; and
wherein the second client is further configured with instructions to acquire an IP address ("first IP address") of the first client before send onto the network said packets from each of the determined series of source ports, wherein said acquired first IP address is included in said packets of the second client.

35. The network traversal system of claim 34, wherein the acquired first IP address and acquired second IP address are received from a server in electronic communication with the first client and the second client.

36. The network traversal system of claim 1, wherein the packets sent from the first client are compatible with the UDP protocol.

37. The network traversal system of claim 1, wherein the network is a public network.

38. The network traversal system of claim 1, wherein the first client is a wireless device.

39. The network traversal system of claim 1, wherein the second client is a wireless device.

40. The network traversal system of claim 1, and wherein the first client has a memory and a processor.

41. The network traversal system of claim 1, and wherein two of the NAT's are border NAT's, and wherein exactly one of the border NAT's is a symmetric NAT.

42. The network traversal system of claim 1, and wherein the first client includes a hardware device, and wherein the second client includes a hardware device, and wherein the packets sent onto the network by the second client are sent at approximately a same time as the packets sent onto the network by the first client, and wherein time is measured in reference to a clock signal of each of the respective hardware devices.

43. The network traversal system of claim 1, and wherein a symmetric NAT is a NAT that is configured to:
  replace an internal source IP address with a public IP address and internal source port with a randomly generated source port and, for a period of time, associate to the originating internal IP address and port to a resulting quintuple consisting of IP protocol, translated source IP address and port, destination IP address and port;
  allow external inbound packets only when each inbound packet completely matches the quintuple from an existing association after swapping source and destination IP addresses and ports in respective packets; and
  discard external inbound packets that do not match any existing quintuple association and for a period of time, prevent the generation of associations matching the quintuples of any received but discarded packets.

44. The system of claim 1, wherein at least one of the client configurations with instructions is determined by a server and communicated to the first client, second client or both clients for performance by the respective clients.

45. A system to configure a plurality of network address translators (NATs) to establish direct bidirectional internet packet transmission between a first device and a second device residing on different local area networks (LANs) and each device using a single Internet protocol, wherein said plurality of NATs include at least one symmetric NAT and at least one non-symmetric NAT, the system comprising:
  the first device operating on a first LAN having at least one symmetric NAT, the first device configured with instructions to cause the first device to perform the following in any order:
  produce a plurality of possible destination ports of a second device;
  detect a signal for sending packets to the second device;
  after detecting the signal, send to its first NAT one or more packets to each of the produced plurality of possible destination ports of the second device from a source port of the first device, wherein said packets from the first device make available potential IP address:port combinations for directly connecting the first device with the second device, wherein a direct connection includes (1) an IP address:port combination for use by the first device to reach the second device and (2) another IP address:port combination for use by the second device to reach the first device;
  listen for at least a listen period for receipt of one or more packets from a source port of the second device; and
  upon receipt of a packet from the second device, extract information from the packet including an IP address:port combination of the second device that enables the first device to directly address future packets to the second device; and
  the second device operating on a second LAN having no symmetric NAT, the second device configured with instructions to cause the second device to perform the following in any order:
  produce a plurality of possible source ports of the second device;
  detect a signal for sending packets to the first device;
  after detecting the signal, send to its first NAT one or more packets from each of the produced plurality of possible source ports to a destination port of the first device;
  listen for and receive a packet from the first device; and
  extract from the received packet information including an IP address:port combination of the first device that enables the second device to directly address future packets to the first device.

46. The system of claim 45, wherein the single Internet protocol is the user datagram protocol (UDP).

47. The system of claim 45, wherein at least one of the device configurations with instructions is determined by a third device and communicated to the first device, second device or both devices for performance by the respective device or devices.

48. The system of claim 47, wherein the third device includes a server.

* * * * *